(12) United States Patent
Au et al.

(10) Patent No.: US 10,506,482 B2
(45) Date of Patent: Dec. 10, 2019

(54) METHOD AND APPARATUS FOR PROVISIONING PHYSICAL SIGNALS AND CHANNELS FOR MOBILE USER EQUIPMENT IN A WIRELESS NETWORK

(71) Applicant: Huawei Technologies Co., Ltd., Shenzhen (CN)

(72) Inventors: Kelvin Kar Kin Au, Kanata (CA); Jianglei Ma, Ottawa (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/594,510

(22) Filed: May 12, 2017

(65) Prior Publication Data
US 2018/0332515 A1 Nov. 15, 2018

(51) Int. Cl.
*H04W 36/00* (2009.01)
*H04W 36/04* (2009.01)
(Continued)

(52) U.S. Cl.
CPC ....... *H04W 36/04* (2013.01); *H04W 28/0215* (2013.01); *H04W 36/0061* (2013.01);
(Continued)

(58) Field of Classification Search
CPC ....... H04B 7/2606; H04B 1/38; H04W 16/06; H04W 16/32; H04W 36/30; H04W 88/06;
(Continued)

(56) References Cited

U.S. PATENT DOCUMENTS

| 7,768,976 | B2 * | 8/2010 | Burgess | H04W 36/10 370/331 |
| 10,219,259 | B2 * | 2/2019 | Kubota | H04B 7/0621 |

(Continued)

FOREIGN PATENT DOCUMENTS

| CN | 102448132 A | 5/2012 |
| CN | 104509167 A | 4/2015 |
| CN | 106416377 A | 2/2017 |

OTHER PUBLICATIONS

Amine Maaref et al., U.S. Appl. No. 15/594,506 entitled Method and Apparatus for Provisioning Physical Signals and Channels in a Wireless Network filed May 12, 2017 (51 pages).
(Continued)

*Primary Examiner* — Jonathan L Sample
*Assistant Examiner* — B M M Hannan
(74) *Attorney, Agent, or Firm* — Trop, Pruner & Hu, P.C.

(57) ABSTRACT

Approaches for provisioning and communicating physical signals and/or channels in NR networks are disclosed. Operations include transmitting from, or receiving at, or transmitting to, or receiving from, a transmit and receive point of an NR Cell, a physical signal and/or channel based on a user equipment (UE) specific parameter assigned via another NR Cell, and transmitting from, or receiving at, or transmitting to, or receiving from, the transmit and receive point another signal and/or channel wherein the other signal and/or channel is based on a UE specific parameter assigned via the NR Cell. A transmit and receive point and a UE for implementing the operations are also disclosed. The UE specific parameters can belong to different UE ID groups, where one of the groups is associated with mobile UEs. Approaches for allocating, assigning and monitoring for UE specific parameters are also disclosed.

36 Claims, 22 Drawing Sheets

(51) Int. Cl.
  *H04W 48/10* (2009.01)
  *H04W 28/02* (2009.01)
  *H04W 40/12* (2009.01)
  *H04W 40/24* (2009.01)
  *H04W 40/36* (2009.01)

(52) U.S. Cl.
  CPC ......... *H04W 40/12* (2013.01); *H04W 40/244* (2013.01); *H04W 40/36* (2013.01); *H04W 48/10* (2013.01); *H04W 36/0009* (2018.08)

(58) Field of Classification Search
  CPC . H04W 36/04; H04W 8/005; H04W 28/0215; H04W 72/048; H04W 4/70; H04W 48/10; H04W 48/12; H04W 72/005; H04W 36/06; H04W 36/08; H04W 36/10
  See application file for complete search history.

(56) References Cited

U.S. PATENT DOCUMENTS

| | | | | |
|---|---|---|---|---|
| 2009/0132675 | A1* | 5/2009 | Horn | H04W 8/26 709/207 |
| 2013/0013797 | A1 | 1/2013 | Henttonen et al. | |
| 2013/0114429 | A1 | 5/2013 | Jonsson et al. | |
| 2013/0344877 | A1* | 12/2013 | Ma | H04W 16/04 455/446 |
| 2014/0092866 | A1 | 4/2014 | Teyeb et al. | |
| 2015/0056997 | A1 | 2/2015 | Su et al. | |
| 2015/0141002 | A1 | 5/2015 | Ma | |
| 2015/0282058 | A1* | 10/2015 | Forssell | H04W 48/16 455/552.1 |
| 2016/0007138 | A1* | 1/2016 | Palanisamy | H04W 4/70 455/41.2 |
| 2016/0249279 | A1 | 8/2016 | Koorapaty et al. | |
| 2017/0265166 | A1* | 9/2017 | Hosseini | H04L 27/2601 |
| 2017/0332283 | A1* | 11/2017 | Kubota | H04W 36/0016 |
| 2017/0332371 | A1* | 11/2017 | Kubota | H04B 7/0621 |
| 2017/0353343 | A1 | 12/2017 | Cezanne | |
| 2018/0014218 | A1 | 1/2018 | Kubota | |
| 2018/0048375 | A1* | 2/2018 | Guo | H04B 7/0695 |
| 2018/0048413 | A1* | 2/2018 | Liu | H04J 11/0069 |
| 2018/0288654 | A1* | 10/2018 | Shih | H04W 76/10 |
| 2018/0317212 | A1* | 11/2018 | Kazmi | H04W 56/00 |
| 2018/0352491 | A1* | 12/2018 | Shih | H04W 36/14 |
| 2019/0090150 | A1* | 3/2019 | Axen | H04W 36/0094 |

OTHER PUBLICATIONS

R1-1611971 Intel Corporation,"Mobility for NR",3GPP TSG RAN WG1 Meeting #87,Reno, Nevada, U.S.A., Nov. 14-18, 2016, 5 pages.

U.S. Appl. No. 15/594,506, Final Rejection dated Sep. 6, 2018, pp. 1-27 and attachment.

U.S. Appl. No. 15/594,506, Non-Final Rejection dated Mar. 12, 2018, pp. 1-27 and attachment.

ISA/CN, International Search Report and Written Opinion for PCT/CN2018/080162 dated Jun. 13, 2018 (9 pages).

3GPP TR 36.881 V14.0.0, Technical Report 3rd Generation Partnership Project; Technical Specification Group Radio Access Network; Evolved Universal Terrestrial Radio Access (E-UTRA); Study on latency reduction techniques for LTE (Release 14), Jun. 2016 (100 pages).

3GPP TSG-RAN WG2 #97 R2-1701804, Agenda Item: 10.3.1.1.2, Source: Huawei, HiSilicon, Qualcomm Incorporated, Sony, Title: UL-based mobility for UEs in active state, Document for: Discussion and Decision, Athens, Greece, Nov. 14-18, 2016 (5 pages).

* cited by examiner

| Value (hexa-decimal) | RNTI |
|---|---|
| 0000 | N/A |
| 0001-0960 | RA-RNTI, C-RNTI, Semi-Persistent Scheduling C-RNTI, Temporary G-RNTI, eIMTA-RNTI, TPC-PUCCH-RNTI, TPG-PUSCH-RNTI, SL-RNTI (see note), G-RNTI, SL-V-RNTI and SRS TPC-RNTI |
| 0961-FFDB | C-RNTI, Semi-Persistent Scheduling C-RNTI, eIMTA-RNTI, Temporary G-RNTI, TPG-PUCCH-RNTI, TPG-PUSCH-RNTI, SL-RNTI, G-RNTI, SL-V-RNTI and SRS TPC-RNTI |
| FFDC-FFF3 | Mobility C-RNTI |
| FFF4-FFF9 | Reserved for future use |
| FFFA | SC-N-RNTI |
| FFFB | SC-RNTI |
| FFFC | CC-RNTI |
| FFFD | M-RNTI |
| FFFE | P-RNTI |
| FFFF | SI-RNTI |

FIG. 15

METHOD AND APPARATUS FOR PROVISIONING PHYSICAL SIGNALS AND CHANNELS FOR MOBILE USER EQUIPMENT IN A WIRELESS NETWORK

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

When a user equipment (UE) switches from one LTE cell to the next, for example in the case of a handover in wireless communication systems operating in accordance with the 3GPP LTE standard, the cell identifier (Cell ID) and other UE specific parameters associated with communications between the UE and the LTE network change. And given the manner in which physical channels and physical signals are generated are a function of the Cell ID and other UE specific parameters, these channels and signals will change from one cell to the next, for example, in terms of their physical mappings (including the time, frequency and or code resource to employ), scrambling and/or sequences to use. Such channels and signals can include downlink (DL) and uplink (UL) channels, including pilot signals, control channels (e.g. dedicated control channels, common control channels, broadcast channels) and data channels.

Contrary a typical LTE cell serviced by one transmit/receive point with a unique Cell ID, a New Radio (NR) cell for use in an NR system operating in accordance with the 3GPP standards, can include many transmit/receive points (TRPs) using the same NR Cell ID. Given the differences between an NR system and a traditional LTE system, there is a need for improved handover and cell reselection techniques for use in NR systems.

BRIEF DESCRIPTION OF THE SEVERAL VIEWS OF THE DRAWINGS

FIG. 15 illustrates an example of Mobility UE IDs that can be allocated in accordance with the present disclosure.

SUMMARY OF THE INVENTION

Figure 1:
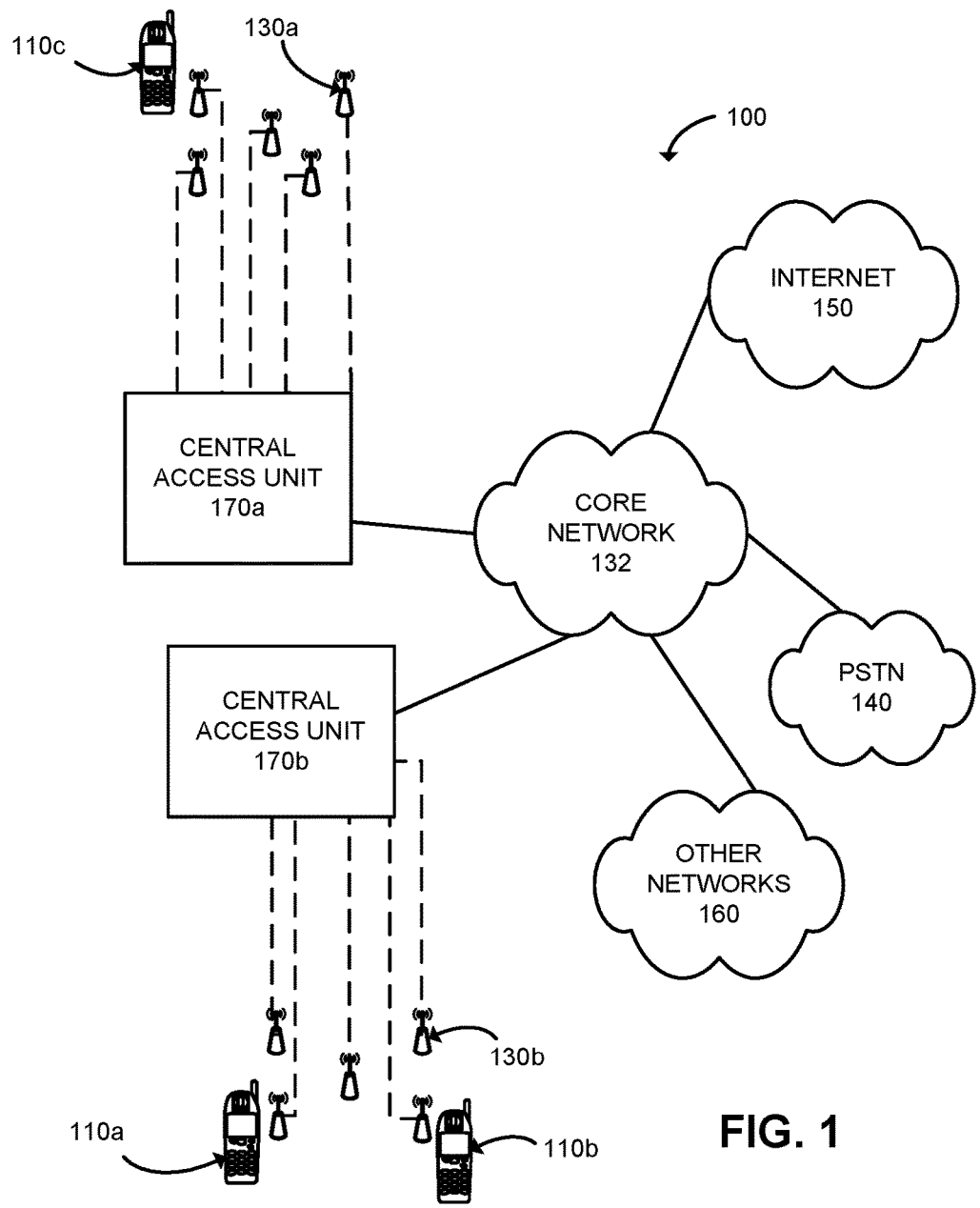
FIG. 1 illustrates an embodiment of a New Radio (NR) network in accordance with the present disclosure.

The present disclosure presents methods and structures that help overcome the difficulties of operating a cellular network with one or more New Radio (NR) cells, also known as hypercells, particularly with respect to a User Equipment (UE) transitioning from communicating with one NR Cell to communicating with another.

According to one aspect of the present disclosure, there is provided a method for transmitting from, or receiving at, a transmit and receive point of an NR Cell, a physical signal and/or channel based on a user equipment (UE) specific parameter assigned via another NR Cell, and transmitting from, or receiving at, the transmit and receive point another signal and/or channel wherein the other signal and/or channel is based on a UE specific parameter assigned via the NR Cell. The UE specific parameters can belong to different UE ID groups. The method includes transmitting from or receiving by a first group of at least one of the first subset of transmit and receive points a first signal or channel for a first user equipment (UE) using a first UE ID assigned to the first UE via at least one of the second subset of transmit and receive points. The method further includes transmitting from or receiving by the first group of at least one of the first subset of transmit and receive points a second signal or channel for a second UE using a second UE ID assigned to the second UE via at least one of the first subset of transmit and receive points in place of a third UE ID assigned to the second UE via at least one of the second subset of transmit and receive points. Wherein the first UE ID is from a first UE ID group and wherein the second UE ID is from a second UE ID group.

According to the described aspect of the present disclosure, transitioning from communicating with one NR Cell to a new NR Cell is more efficient compared to other methods. With prior methods, when a UE transitioned from communicating with one NR Cell to another, the UE would have to begin transmitting and receiving signals and channels provisioned in accordance with a new UE specific parameter (e.g. a UE ID) assigned by the new NR Cell. By allowing at least one transmit and receive point associated with the new NR Cell to transmit and receive synchronization signals and/or physical signals and/or channels provisioned in accordance with a UE specific parameter assigned by the other NR Cell, the UE and the at least one transmit and receive point can avoid having to communicate using signals and channels provisioned in accordance with a new UE specific parameter. Such an approach avoids having to assign by the network/obtain by the UE a new UE specific parameter, and avoids the network and UE having to provision and determine, physical signals and channels provisioned in accordance with different UE specific parameters. Such an approach can reduce overhead, which can increase spectral efficiency, and can further reduce latency and processing. The at least one transmit and receive point can also transmit and receive signals and channels provisioned in accordance with a UE specific parameter assigned by the new NR Cell. Groups of UE specific parameters can be used for identifying UEs for which a new UE specific parameter will not, at least initially, need to change when communicating with the new NR Cell compared to UEs for which a new UE specific parameter will be required. Such an approach reduces overhead and provides for greater network efficiency and flexibility in deciding which UEs to treat in which manner during a handover from one NR Cell to another. Moreover, in order to provide a more seamless mobility experience for UEs moving between NR Cells, it is advantageous for multiple transmit and receive points from the two or more NR Cells to co-ordinate and serve these UEs. Since physical signals and channels are provisioned in accordance with UE specific parameters (e.g. a UE ID), a common UE specific parameter such as a UE ID that is shared and known by these transmit and receive points (i.e. Mobility C-RNTI) will facilitate the coordinated transmissions and receptions of the physical signals and channels in the NR Cell boundary. Not all UEs in the transition area between NR Cells need to be assigned mobility C-RNTI. Alternatively, a globally unique identifier (across all NR Cells) may be assigned to a UE for physical signals and channels generation.

In some embodiments of the method according to the above-described aspect of the present disclosure or any other aspects thereof, a number of optional operations and features are employed. One optional feature is the first UE ID group includes a first plurality of UE IDs and the second UE ID group includes a second plurality of UE IDs, the method may further comprise, receiving from the one or more access units an indication of the first plurality of UE IDs in the first UE ID group and the second plurality of UE IDs in the second UE ID group. Another optional feature is the method includes transmitting an indication of a first plurality of UE IDs in the first UE ID group. Another optional feature includes disabling use of the first UE ID group. Another optional feature is the method includes receiving from at least one transmit and receive point of the first subset of transmit and receive points of the plurality of transmit and receive points an indication of the first UE ID. Another optional feature is receiving from at least one transmit and receive point of the first subset of transmit and receive points of the plurality of transmit and receive points the indication of the first UE ID includes via one or more of the access units. Another optional feature is where the first UE ID group is modified to contain additional UE IDs beyond a first plurality of UE IDs in the first UE ID group. Another optional feature is the first UE ID is assigned based on downlink measurements reported from the first UE. Another optional feature is the first UE ID is assigned based on uplink communications received from the first UE. Another optional feature is where the uplink communications include sounding reference signals. Another optional feature is where the first UE ID is assigned pursuant to a contention-free access procedure. Another optional feature is where the first UE ID is assigned pursuant to a random access procedure. Another optional feature is where the first UE ID is assigned based on a UE type. Another optional feature is where the first UE ID is assigned based on a UE mobility. Another optional feature is where the first UE ID is assigned based on a UE type. Another optional feature is the method further including monitoring for uplink transmissions provisioned based on the first UE ID with knowledge that the first UE ID is assigned. Another optional feature is the method further including monitoring for uplink transmissions provisioned based on the first UE ID without knowledge that the first UE ID is assigned.

According to another aspect of the present disclosure, there is provided a method for transmitting to, or receiving from, a transmit and receive point of an NR Cell, a physical signal and/or channel based on a user equipment (UE) specific parameter assigned via another NR Cell, and transmitting from, or receiving at, the transmit and receive point another signal and/or channel wherein the other signal and/or channel is based on a UE specific parameter assigned via the NR Cell. The UE specific parameters can belong to different UE ID groups. The method includes transmitting to or receiving from a first group of at least one of the first subset of transmit and receive points a first signal or channel using a first UE ID assigned via at least one of the second subset of transmit and receive points. The method further includes transmitting to or receiving from the first group of at least one of the first subset of transmit and receive points a second signal or channel using a second UE ID assigned via at least one of the first subset of transmit and receive points in place of a third UE ID assigned via at least one of the second subset of transmit and receive points. Wherein the first UE ID is from a first UE ID group and wherein the second UE is from a second UE ID group.

According to the described aspect of the present disclosure, transitioning from communicating with one NR Cell to a new NR Cell is more efficient compared to other methods. With prior methods, when a UE transitioned from communicating with one NR Cell to another, the UE would have to begin transmitting and receiving signals and channels provisioned in accordance with a new UE specific parameter (e.g. a UE ID) assigned by the new NR Cell. By allowing at least one transmit and receive point associated with the new NR Cell to transmit and receive synchronization signals and/or physical signals and/or channels provisioned in accordance with a UE specific parameter assigned by the other NR Cell, the UE and the at least one transmit and receive point can avoid having to communicate using signals and channels provisioned in accordance with a new UE specific parameter. Such an approach avoids having to assign by the network/obtain by the UE a new UE specific parameter, and avoids the network and UE having to provision, and determine, physical signals and channels provisioned in accordance with different UE specific parameters. Such an approach can reduce overhead, which can increase spectral efficiency, and can further reduce latency and processing. The at least one transmit and receive point can also transmit and receive signals and channels provisioned in accordance with a UE specific parameter assigned by the new NR Cell. Groups of UE specific parameters can be used for identifying UEs for which a new UE specific parameter will not, at least initially, need to change when communicating with the new NR Cell compared to UEs for which a new UE specific parameter will be required. Such an approach reduces overhead and provides for greater network efficiency and flexibility in deciding which UEs to treat in which manner during a handover from one NR Cell to another. Moreover, in order to provide a more seamless mobility experience for UEs moving between NR Cells, it is advantageous for multiple transmit and receive points from the two or more NR Cells to co-ordinate and serve these UEs. Since physical signals and channels are provisioned in accordance with UE specific parameters (e.g. a UE ID), a common UE specific parameter such as a UE ID that is shared and known by these transmit and receive points (i.e. Mobility C-RNTI) will facilitate the coordinated transmissions and receptions of the physical signals and channels in the NR Cell boundary. Not all UEs in the transition area between NR Cells need to be assigned mobility C-RNTI. Alternatively, a globally unique identifier (across all NR Cells) may be assigned to a UE for physical signals and channels generation.

In some embodiments of the method according to the above-described aspect of the present disclosure or any other aspect thereof, a number of optional operations and features are employed. One optional feature is the first UE ID group includes a first plurality of UE IDs and the second UE ID group includes a second plurality of UE IDs, the method further comprising, receiving from the one or more access units an indication of the first plurality of UE IDs in the first UE ID group and the second plurality of UE IDs in the second UE ID group. Another optional feature is receiving an indication of a first plurality of UE IDs in the first UE ID group. Another optional feature is disabling use of the first UE ID group. Another optional feature is the first UE ID group is modified to contain additional UE IDs beyond a first plurality of UE IDs in the first UE ID group. Another optional feature is transmitting downlink measurements, wherein the first UE ID is assigned based on the downlink measurements. Another optional feature is transmitting uplink communications, wherein the first UE ID is assigned based on the uplink communications. Another optional feature is the uplink communications include sounding reference signals. Another optional feature is the first UE ID is received pursuant to a contention-free access procedure. Another optional feature is the first UE ID is received pursuant to a random access procedure. Another optional feature is the first UE ID is assigned based on a UE type. Another optional feature is the first UE ID is assigned based on UE mobility.

According to another aspect of the present disclosure, there is provided a transmit and receive point of an NR Cell for transmitting from, or receiving at, a physical signal and/or channel based on a user equipment (UE) specific parameter assigned via another NR Cell, and transmitting from, or receiving at, the transmit and receive point another signal and/or channel wherein the other signal and/or channel is based on a UE specific parameter assigned via the NR Cell. The UE specific parameters can belong to different UE ID groups. The transmit and receive point includes processing circuitry, transceiver circuitry and memory. The memory includes instructions for causing the processing circuitry to transmit or receive, via the transceiver circuitry, a first signal or channel for a first user equipment (UE) using a first UE ID assigned to the first UE via at least one of the second subset of transmit and receive points. The memory includes instructions for causing the processing circuitry transmit or receive, via the transceiver circuitry, a second signal or channel for a second UE using a second UE ID assigned to the second UE via at least one of the first subset of transmit and receive points in place of a third UE ID assigned to the second UE via at least one of the second subset of transmit and receive points. Wherein the first UE ID is from a first UE ID group and wherein the second UE ID is from a second UE ID group.

According to the described aspect of the present disclosure, a transmit and receive point for transitioning from communicating with one NR Cell to a new NR Cell is more efficient compared to other transmit and receive points. With prior transmit and receive points, when a UE transitioned from communicating with one NR Cell to another, the UE would have to begin transmitting and receiving signals and channels provisioned in accordance with a new UE specific parameter (e.g. a UE ID) assigned by the new NR Cell. By allowing at least one transmit and receive point associated with the new NR Cell to transmit and receive synchronization signals and/or physical signals and/or channels provisioned in accordance with a UE specific parameter assigned by the other NR Cell, the UE and the at least one transmit and receive point can avoid having to communicate using signals and channels provisioned in accordance with a new UE specific parameter. Such an approach avoids having to assign by the network/obtain by the UE a new UE specific parameter, and avoids the network and UE having to provision, and determine, physical signals and channels provisioned in accordance with different UE specific parameters. Such an approach can reduce overhead, which can increase spectral efficiency, and can further reduce latency and processing. The at least one transmit and receive point can also transmit and receive signals and channels provisioned in accordance with a UE specific parameter assigned by the new NR Cell. Groups of UE specific parameters can be used for identifying UEs for which a new UE specific parameter will not, at least initially, need to change when communicating with the new NR Cell compared to UEs for which a new UE specific parameter will be required. Such an approach reduces overhead and provides for greater network efficiency and flexibility in deciding which UEs to treat in which manner during a handover from one NR Cell to another. Moreover, in order to provide a more seamless mobility experience for UEs moving between NR Cells, it is advantageous for multiple transmit and receive points from the two or more NR Cells to co-ordinate and serve these UEs. Since physical signals and channels are provisioned in accordance with UE specific parameters (e.g. a UE ID), a common UE specific parameter such as a UE ID that is shared and known by these transmit and receive points (i.e. Mobility C-RNTI) will facilitate the coordinated transmissions and receptions of the physical signals and channels in the NR Cell boundary. Not all UEs in the transition area between NR Cells need to be assigned mobility C-RNTI. Alternatively, a globally unique identifier (across all NR Cells) may be assigned to a UE for physical signals and channels generation.

In some embodiments of the transmit and receive point according to the above-described aspect of the present disclosure or any other aspect thereof, a number of optional operations and features are employed. One optional feature is the first UE ID group includes a first plurality of UE IDs, the second UE ID group includes a second plurality of UE IDs, and the memory further includes instructions for causing the processing circuitry to receive, via the transceiver circuitry, from the one or more access units an indication of the first plurality of UE IDs in the first UE ID group and the second plurality of UE IDs in the second UE ID group. Another optional feature is the memory further includes instructions for causing the processing circuitry to transmit, via the transceiver circuitry, an indication of a first plurality of UE IDs in the first UE ID group. Another optional feature is the memory further includes instructions for causing the processing circuitry to disable use of the first UE ID group. Another optional feature is the memory further includes instructions for causing the processing circuitry to receive, via the transceiver circuitry, from at least one transmit and receive point of the first subset of transmit and receive points of the plurality of transmit and receive points an indication of the first UE ID. Another optional feature is the memory further includes instructions for causing the processing circuitry to receive, via the transceiver circuitry, the indication of the first UE ID via one or more of the access units. Another optional feature is the memory further includes instructions for causing the processing circuitry to modify the first UE ID group to contain additional UE IDs beyond a first plurality of UE IDs in the first UE ID group. Another optional feature is the memory further includes instructions for causing the processing circuitry to transmit, via the transceiver circuitry, downlink signals, and wherein the first UE ID is assigned based on downlink measurements pertaining to said downlink signals reported from the first UE. Another optional feature is the memory further includes instructions for causing the processing circuitry to receive, via the transceiver circuitry, uplink communications from the first UE and to transmit to, via the transceiver circuitry, information pertaining to the uplink communications, wherein the first UE ID is assigned based on the information pertaining to the uplink communications. Another optional feature is the uplink communications include sounding reference signals. Another optional feature is the first UE ID is assigned pursuant to a contention-free access procedure. Another optional feature is the first UE ID is assigned pursuant to a random access procedure. Another optional feature is the first UE ID is assigned based on a UE type associated with the first UE. Another optional feature is the first UE ID is assigned based on UE mobility. Another optional feature is the memory further includes instructions for causing the processing circuitry to monitor, via the transceiver circuitry, for uplink transmissions provisioned based on the first UE ID with knowledge that the first UE ID is assigned. Another optional feature is the memory further includes instructions for causing the processing circuitry to monitor, via the transceiver circuitry, uplink transmissions provisioned based on the first UE ID without knowledge that the first UE ID is assigned.

According to another aspect of the present disclosure, there is provided a user equipment (UE) for transmitting to, or receiving from, a transmit and receive point of an NR Cell, a physical signal and/or channel based on a user equipment (UE) specific parameter assigned via another NR Cell, and transmitting from, or receiving at, the transmit and receive point another signal and/or channel wherein the other signal and/or channel is based on a UE specific parameter assigned via the NR Cell. The UE specific parameters can belong to different UE ID groups. The UE includes processing circuitry, transceiver circuitry and memory. The memory includes instructions for causing the processing circuitry to transmit or receive, via the transceiver circuitry, from a first group of at least one of the first subset of transmit and receive points a first signal or channel for using a first UE ID assigned via at least one of the second subset of transmit and receive points. The memory further includes instructions for causing the processing circuitry to transmit or receive, via the transceiver circuitry, from the first group of at least one of the first subset of transmit and receive points a second signal or channel using a second UE ID assigned via at least one of the first subset of transmit and receive points in place of a third UE ID assigned via at least one of the second subset of transmit and receive points. Wherein the first UE ID is from a first UE ID group and wherein the second UE is from a second UE ID group.

According to the described aspect of the present disclosure, a UE transitioning from communicating with one NR Cell to a new NR Cell is more efficient compared to other UEs. With prior UEs, when a UE transitioned from communicating with one NR Cell to another, the UE would have to begin transmitting and receiving signals and channels provisioned in accordance with a new UE specific parameter (e.g. a UE ID) assigned by the new NR Cell. By allowing at least one transmit and receive point associated with the new NR Cell to transmit and receive synchronization signals and/or physical signals and/or channels provisioned in accordance with a UE specific parameter assigned by the other NR Cell, the UE and the at least one transmit and receive point can avoid having to communicate using signals and channels provisioned in accordance with a new UE specific parameter. Such an approach avoids having to assign by the network/obtain by the UE a new UE specific parameter, and avoids the network and UE having to provision, and determine, physical signals and channels provisioned in accordance with different UE specific parameters. Such an approach can reduce overhead, which can increase spectral efficiency, and can further reduce latency and processing. The at least one transmit and receive point can also transmit and receive signals and channels provisioned in accordance with a UE specific parameter assigned by the new NR Cell. Groups of UE specific parameters can be used for identifying UEs for which a new UE specific parameter will not, at least initially, need to change when communicating with the new NR Cell compared to UEs for which a new UE specific parameter will be required. Such an approach reduces overhead and provides for greater network efficiency and flexibility in deciding which UEs to treat in which manner during a handover from one NR Cell to another. Moreover, in order to provide a more seamless mobility experience for UEs moving between NR Cells, it is advantageous for multiple transmit and receive points from the two or more NR Cells to co-ordinate and serve these UEs. Since physical signals and channels are provisioned in accordance with UE specific parameters (e.g. a UE ID), a common UE specific parameter such as a UE ID that is shared and known by these transmit and receive points (i.e. Mobility C-RNTI) will facilitate the coordinated transmissions and receptions of the physical signals and channels in the NR Cell boundary. Not all UEs in the transition area between NR Cells need to be assigned mobility C-RNTI. Alternatively, a globally unique identifier (across all NR Cells) may be assigned to a UE for physical signals and channels generation.

In some embodiments of the UE according to the above-described aspect of the present disclosure or any other aspect thereof, a number of optional operations and features are employed. One optional feature is the first UE ID group includes a first plurality of UE IDs, the second UE ID group includes a second plurality of UE IDs, and the memory further includes instructions for causing the processing circuitry to receive, via the transceiver circuitry, an indication of the first plurality of UE IDs in the first UE ID group and the second plurality of UE IDs in the second UE ID group. Another optional feature is the memory further includes instructions for causing the processing circuitry to receive, via the transceiver circuitry, receive an indication of a first plurality of UE IDs in the first UE ID group. Another optional feature is the memory further includes instructions for causing the processing circuitry to disable use of the first UE ID group. Another optional feature is the memory further includes instructions for causing the processing circuitry to modify the first UE ID group to contain additional UE IDs beyond a first plurality of UE IDs in the first UE ID group. Another optional feature is the memory further includes instructions for causing the processing circuitry to transmit, via the transceiver circuitry, downlink measurements, wherein the first UE ID is assigned based on the downlink measurements. Another optional feature is the memory further includes instructions for causing the processing circuitry to transmit, via the transceiver circuitry, uplink communications, wherein the first UE ID is assigned based on the uplink communications. Another optional feature is the uplink communications include sounding reference signals. Another optional feature is the memory further includes instructions for causing the processing circuitry to receive, via the transceiver circuitry, the first UE ID pursuant to a contention-free access procedure. Another optional feature is the memory further includes instructions for causing the processing circuitry to receive, via the transceiver circuitry, the first UE ID pursuant to a random access procedure. Another optional feature is the first UE ID is assigned based on a UE type. Another optional feature is the first UE ID is assigned based on UE mobility.

DETAILED DESCRIPTION OF THE INVENTION

Contrary to a typical LTE cell serviced by one transmit/receive point with a unique Cell ID, a New Radio (NR) cell (also known as a hypercell or hyper cell) may include many transmit/receive points (transmit/receive points) using the same NR Cell ID, and may cover a much broader area that a typical LTE cell. In NR systems, these transmit/receive points may include, but are not limited to gNodeBs, and may or may not utilize remote radio heads. Unlike a remote radio head a transmit/receive point typically includes its own baseband processing and scheduling functionality and can transmit with or without a remote radio head. A remote radio head by comparison cannot communicate independently of a transmit/receive point. Generally, the NR system enables multiple wireless users to transmit and receive data and other content. While FIG. 1 illustrates an architecture for supporting NR Cells, embodiments of the present disclosure are not limited to this architecture. That is to say, other network architectures for supporting NR Cells are also possible.

As shown in FIG. 1, NR system 100 can include user equipment (UE) 110a-110c, transmit/receive points, including transmit/receive points 130a and 130b, central access units 170a and 170b, a core network 132, a public switched telephone network (PSTN) 140, the Internet 150, and other networks 160. Note, however, that the NR system could have more or less UEs, transmit/receive points and/or central access units.

UEs 110a-110c are configured to operate and/or communicate in the system 100. For example, the UEs 110a-110c are configured to transmit and/or receive wireless signals. Each UE 110a-110c represents any suitable end user device and which may also be referred to as user a wireless transmit/receive unit (WTRU), mobile station, fixed or mobile subscriber unit and may include a cellular telephone, personal digital assistant (PDA), smartphone, laptop or tablet for example.

Transmit/receive points, including transmit/receive points 130a 130b, can include (or may be referred to), for example, mobile-relay stations, base stations, Node-Bs, eNodeBs, gNodeBs (sometimes called "gigabit" NodeBs), site controllers, pico transmitters, or femto transmitters, which can be used in conjunction with remote radio heads (RRHs) in some implementations. A RRH can contain radio frequency circuitry plus analog-to-digital/digital-to-analog converters and up/down converters.

In one arrangement, central access unit 170a can control a first group of transmit/receive points, including transmit/receive point 130a, while central access unit 170b can control a second group of transmit/receive points, including transmit/receive point 130b. A central access unit may communicate with transmit/receive points via optical, wireless or other connections. Central access units 170a and 170b could also communicate directly without use of core network 132. Note, while central access units 170a and 170b are shown separate from their respective transmit/receive points, the central access units could alternatively be co-located with one or more of their respective transmit/receive points. Also, though not shown, the transmit/receive points could communicate directly with each other (e.g. through an Xn interface).

All or a subset of transmit/receive points associated with central access units 170a may be assigned, or reassigned, by the central access unit, a common NR Cell ID to form a NR Cell. Similarly, all or a subset of transmit/receive points associated with central access unit 170b may be assigned a different common NR Cell ID to form another NR Cell. Alternatively, all or a subset of transmit/receive points associated with central access units 170a and 170b could be assigned a common NR Cell ID, by one or more of the access units, in which case the NR Cell would have two central access units associated therewith. The transmit/receive points associated with central access unit 170a, 170b, and/or 170a and 170b together, could also support multiple NR Cells by using different subsets of transmit/receive points and assigning different NR Cell IDs to each subset.

Figure 2:
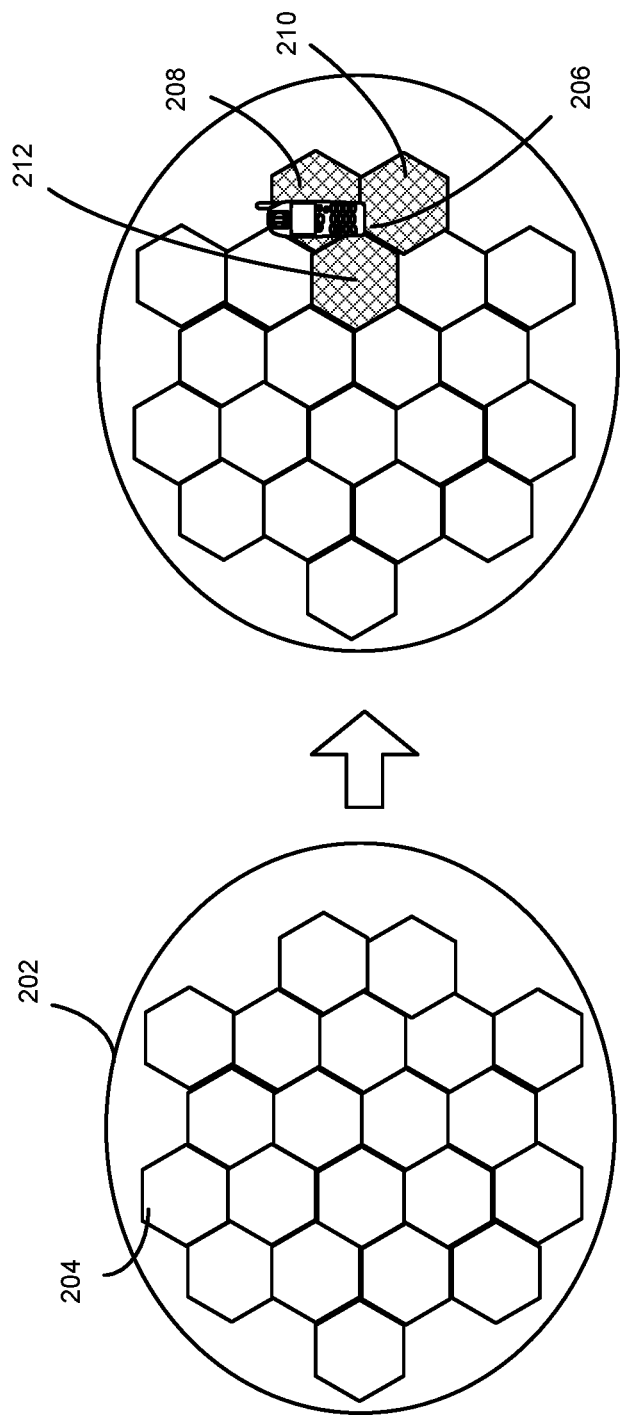
FIG. 2 illustrates an embodiment of a NR Cell in accordance with the present disclosure.

FIG. 2 presents a diagram illustrating an NR Cell in a NR system. A NR cluster 202 includes a number of coverage areas of transmit/receive points, such as coverage area 204. To create a NR Cell, the system (via one or more central access units) assigns a common Cell ID to all the transmit/receive points of the NR cluster that will form the NR Cell. The system may create multiple NR Cells within a NR cluster. FIG. 2 further illustrates transmit/receive points of an NR Cell facilitating data channels and control channels for purposes of communicating with UE 206. As shown therein, the three transmit/receive points 208, 210, and 212 are optimally situated to communicate these channels with UE 206. According to one approach, the system can dynamically combine multiple physical transmitters and receivers to form a virtual transmit/receive point. From the perspective of a UE, the virtual transmit/receive points appear to be a single transmitter/receiver. Similarly, the transmit/receive points of the NR Cell used for receiving uplink communications may differ over time and/or for different users. The transmit/receive points used on the uplink may differ from those used on the downlink. The system may create many different virtual transmit/receive points within a given NR Cell and coordinate their transmissions and receptions, including via use of joint transmissions and receptions, for example so as to manage interference. The system can also dynamically change the physical transmit/receive points that make up the NR Cell.

Figure 3:
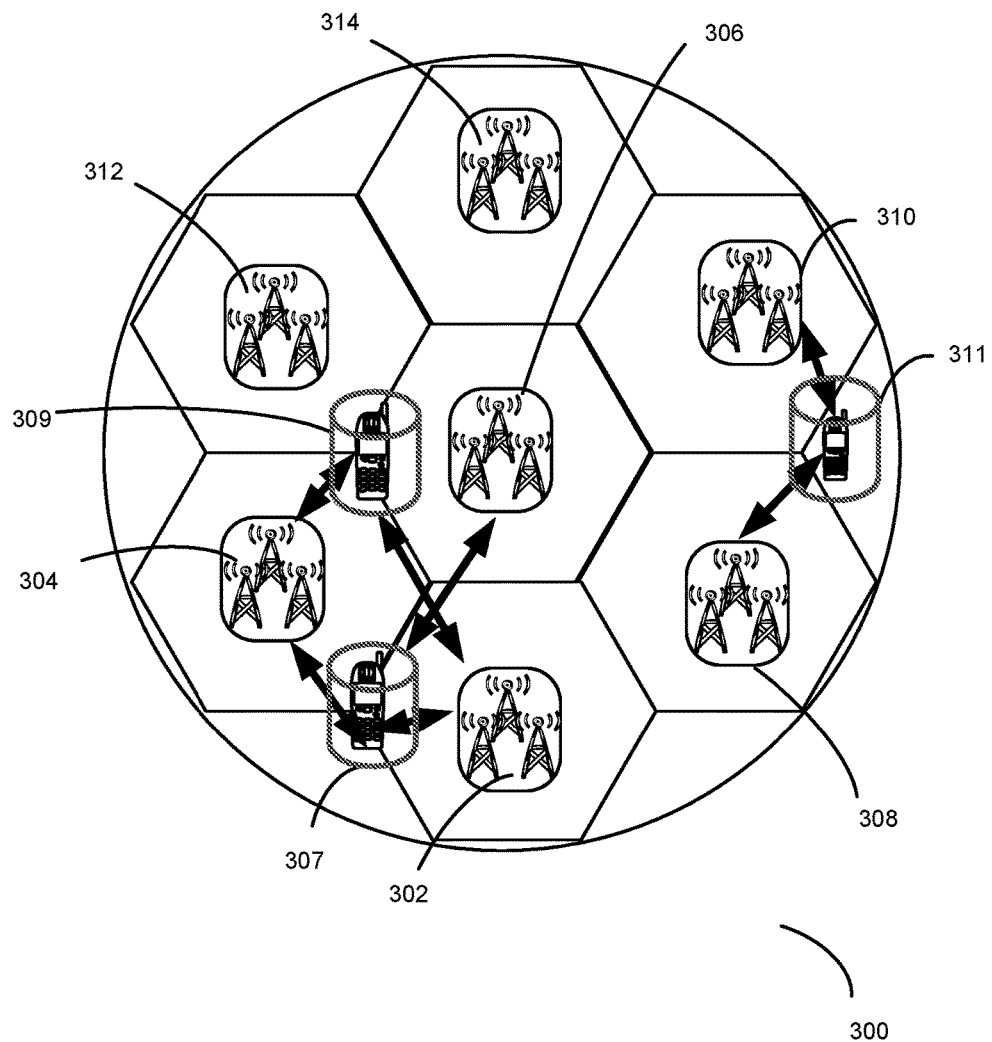
FIG. 3 illustrates another embodiment of a NR Cell in accordance with the present disclosure.

FIG. 3 presents a diagram of an embodiment of an NR Cell that facilitates communications with different sets of transmit/receive points, for purposes of serving different UEs. As noted above with respect to FIG. 2 the NR Cell may utilize one or more different physical transmit/receive points, or different combinations of transmit/receive points, to communicate with different UEs. As the UEs move to different locations, the system can dynamically assign one or more different physical transmit/receive points to service the UEs. For example, as illustrated in FIG. 3, NR Cell 300 is shown supporting three UEs. More specifically, transmit/receive points 302, 304, 306 are shown communicating with UE 307, transmit/receive points 302, 304 are shown communicating with UE 309, and transmit/receive points 308, 310 are shown communicating with UE 311. The central access unit may determine which transmit/receive points to use based on load balancing and UE distribution within a NR Cell.

Figure 4:
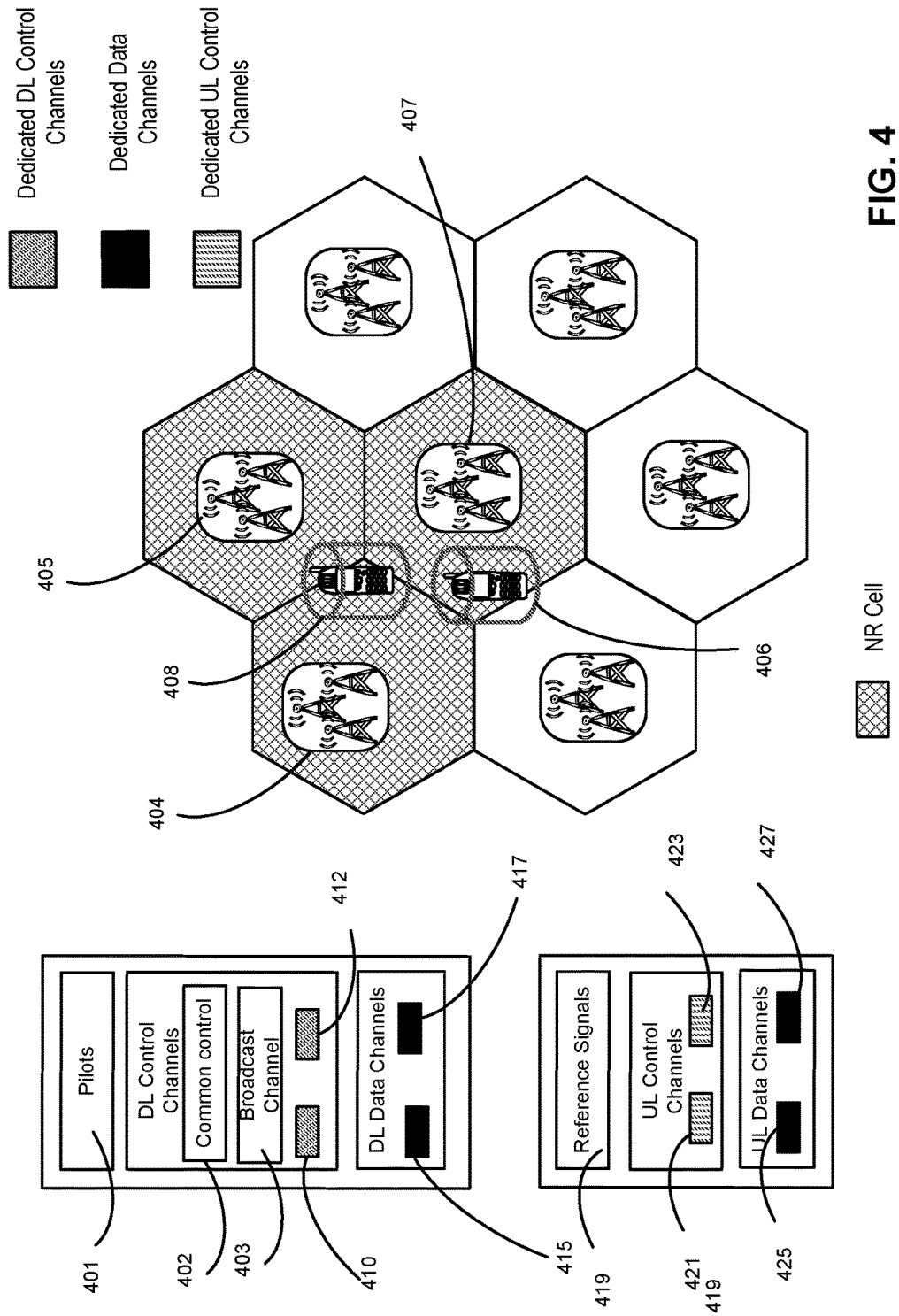
FIG. 4 illustrates another embodiment of a NR Cell in accordance with the present disclosure.

FIG. 4 illustrates another NR Cell communicating with UEs 406 and 408. As shown therein, one or more transmit/receive points of the sets of transmit/receive points 404, 405 and 407 forming the NR cell transmit: pilot signals 401; DL control channels, including common control channel 402, broadcast channel 403, and UE-specific dedicated DL control channels 410 and 412; and UE-specific dedicated DL data channels 415 and 417. Dedicated control channel 410, and DL data channel 415, are specific to UE 406, while dedicated control channels 412, and DL data channel 417, are specific to UE 408. One or more transmit/receive points of the sets of transmit/receive points 404, 405 and 407, can also receive reference signals 419, UE-specific dedicated UL control channels 421 and 423, and UE-specific UL data channels 425 and 427. It is understood that one or more transmit/receive points in the NR cell used for downlink communications, can be the same as, or different from one or more transmit/receive points in the NR cell used for uplink communications. While three transmit/receive points 404, 405 and 407 are shown in FIG. 4 to form the NR cell, it is expressly contemplated that any suitable combination of transmit/receive points may be selected to form the NR cell, and the selection of three transmit/receive points 404, 405 and 407 is purely for the purpose of convenience.

One or more of these signals and channels, including the dedicated control channels and the dedicated data channels, may be generated in accordance with UE specific parameters such as a UE ID (e.g. by scrambling data using the UE ID). Alternatively, or in addition, one or more of these signals and channels may be generated in accordance with a UE specific initialization seed to generate a particular sequence. Alternatively, or in addition, the time, frequency and/or other resources utilized for purposes of these signals and channels may also relate to the UE ID and/or other UE specific parameters.

One or more of the signals and channels can also be generated using an NR Cell ID. An NR Cell ID can be used, without using a UE ID or other UE specific parameter, to distinguish common control channels, broadcast channels, and/or data channels, for example, originating from different NR Cells.

Further, a NR Cell ID can be used together with the UE ID or other UE specific parameters to differentiate transmissions of the NR data channels and/or NR control channels from different NR Cells.

The demodulation of each dedicated control channel may be performed in accordance with a UE-specific reference signal (RS), the sequence and location of which are linked to the UE ID or other UE specific parameters or configurable ID.

Broadcast channels may include physical broadcast channel (PBCH) and physical data channel carrying system information. Synchronization signals may include a primary synchronization signal (PSS) and/or a secondary synchronization signal (SSS). The physical broadcast channel typically transmits essential minimum system information that is required for a UE to communicate with the NR system (e.g. the system bandwidth, part of the system frame number, information on where to locate the remaining system information, periodicity of the synchronization signals and synchronization signal block (SS block) time index indication etc.). The NR system may further group the transmission of synchronization signals and PBCH together into an "SS block" (e.g. the PSS, SSS and PBCH are transmitted in consecutive OFDM symbols). Furthermore, in the case of multi-beam transmission (e.g. in high frequency operation), a series of SS blocks can be transmitted in an SS burst set whereby each SS block is transmitted in a particular beam direction. The SS blocks within an SS burst set may contain the same synchronization signals associated with the same NR Cell ID.

Other aspects of implementations of hyper cell, namely NR cell, are proposed in U.S. Pat. No. 8,838,119, entitled "Method and system for dynamic cell configuration", which is hereby incorporated by reference in its entirety.

The NR system may apply transmit/receive point selection techniques and transmit power control techniques to minimize intra-NR Cell interference and inter-NR Cell interference. For a UE with a poor Signal to Interference plus Noise Ratio (SINR), the system can transmit the NR dedicated control channel and/or NR data channel from multiple transmit/receive points jointly to improve signal quality, including using MIMO processing.

Figure 5:
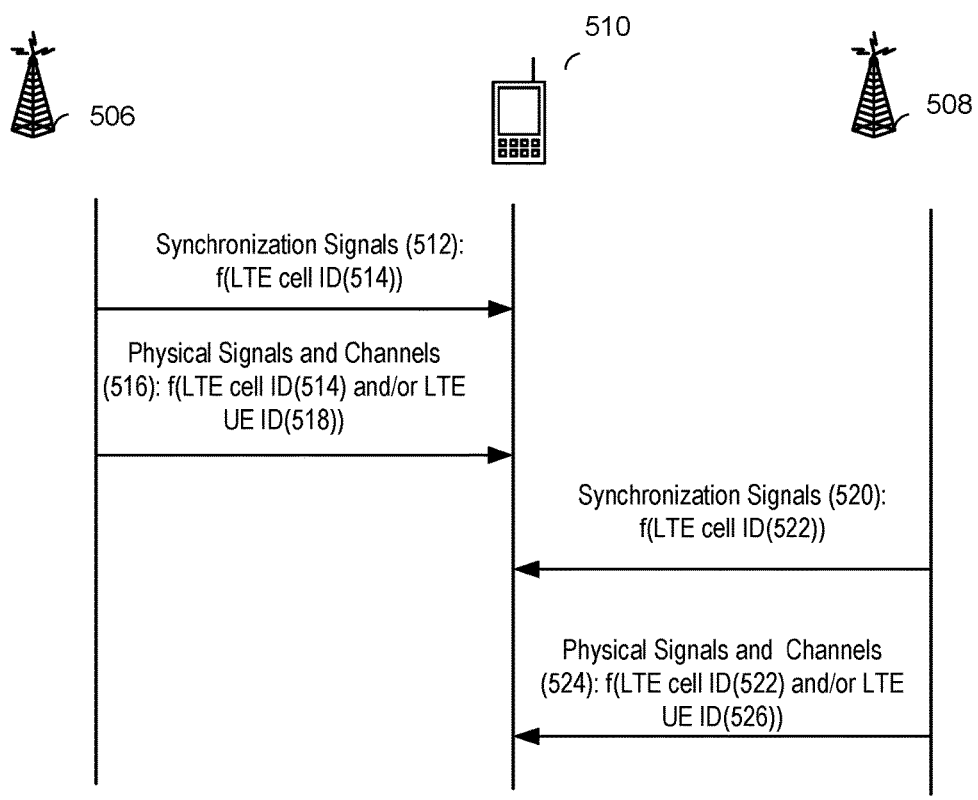
FIG. 5 illustrates synchronization signals and physical signals and channels being transmitted in a wireless network in accordance with the present disclosure.

One benefit to an NR system is that it overcomes the problem of a UE switching between LTE cells, for example, that have unique Cell IDs and that use separate UE specific parameters. As shown in FIG. 5, when UE 510 switches from communicating with eNodeB 506, to communicating with eNodeB 508, the generation of physical signals and physical channels change as a result of the LTE Cell IDs and LTE UE specific parameters changing. For example, UE 510 receives from eNodeB 506 synchronization signals 512 generated as a function of LTE Cell ID 514, and physical signals and channels 516 generated as a function of LTE Cell ID 514 and/or LTE UE specific parameter 518. When UE 510 switches to communicating with eNodeB 508, UE must then receive synchronization signals 520, generated as a function of LTE Cell ID 522, and physical signals and channels 524 generated as a function of LTE Cell ID 522 and/or LTE UE specific parameter 526. The problem with this approach is that it wastes spectral resources, increases latency and increases processing on both the network and UE side (which also drains batteries on the UE side), to obtain the different LTE Cell IDs and LTE UE specific parameters, and to generate physical signals and channels based on these differing IDs. Similarly, utilizing different LTE Cell IDs as part of a cell reselection process also wastes resources and increases processing at the network and UE.

Figures 6A, 6B:
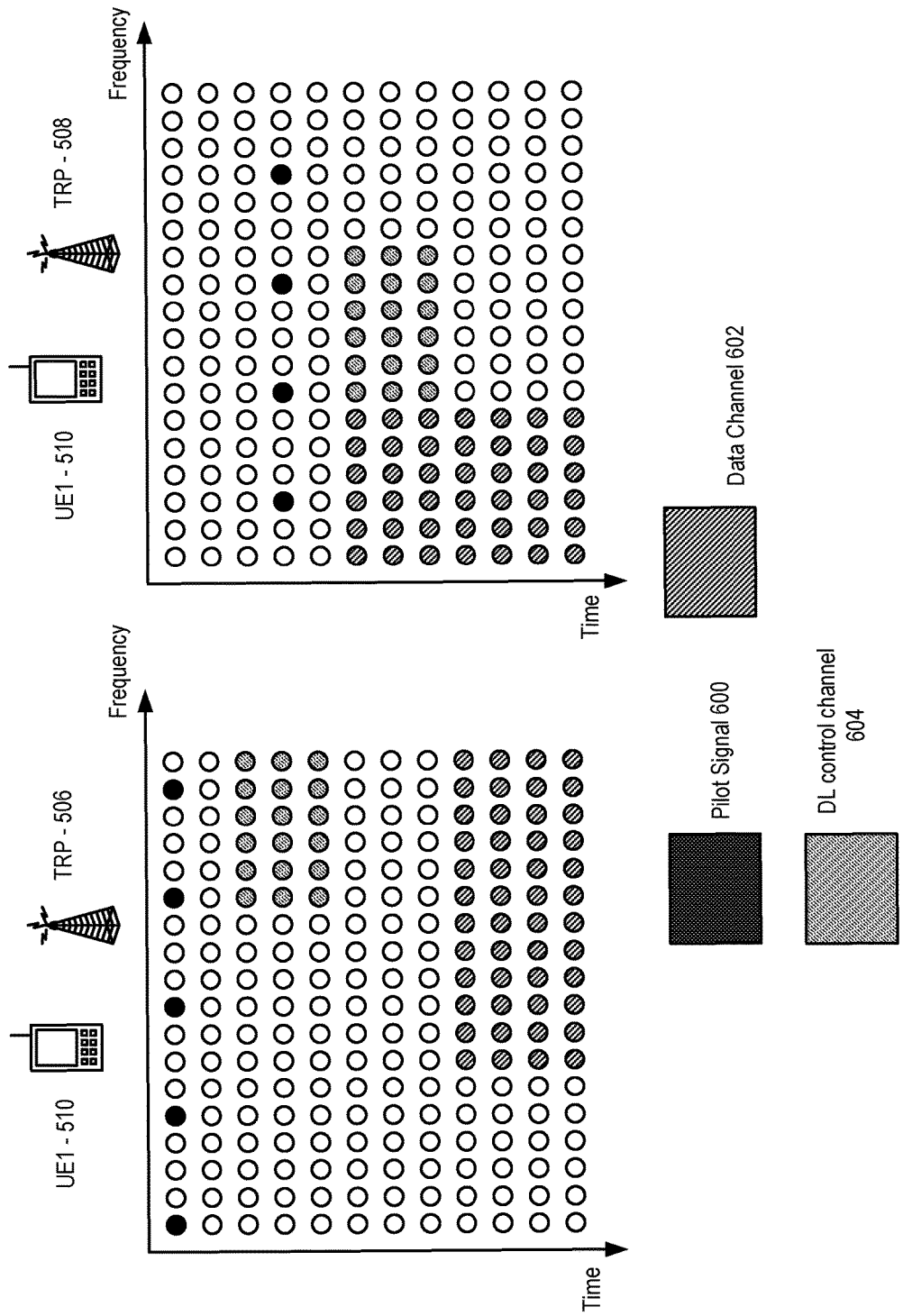
FIGS. 6A and 6B illustrates physical signal and channel mapping in a wireless network in accordance with the present disclosure.

As shown in FIG. 6A and FIG. 6B, as a result of the change in LTE Cell ID and LTE UE specific parameters occurring with UE 510 switching from communicating with eNodeB 506, to communicating with eNodeB 508 as shown in FIG. 5, the respective physical mappings may change (i.e. the time, frequency, code and/or other resource to use). For example, for pilot signal 600, data channel 602 and DL control channel 604, the physical mappings change, in terms of the time and frequency resources used, from a first time period associated with UE 510 communicating with eNodeB 506 shown in FIG. 6A to a second time period associated with UE 510 communicating with eNodeB 508 shown in FIG. 6B. Though not shown in FIG. 6A or B, the scrambling applied and/or sequence to be used for generating these various physical signals and channels can also change, with or without the resources used changing. Also not shown, the resources, scrambling and/or sequences used for UL signals and channels could also change based on changes in LTE Cell ID and LTE UE specific parameters.

Figure 7:
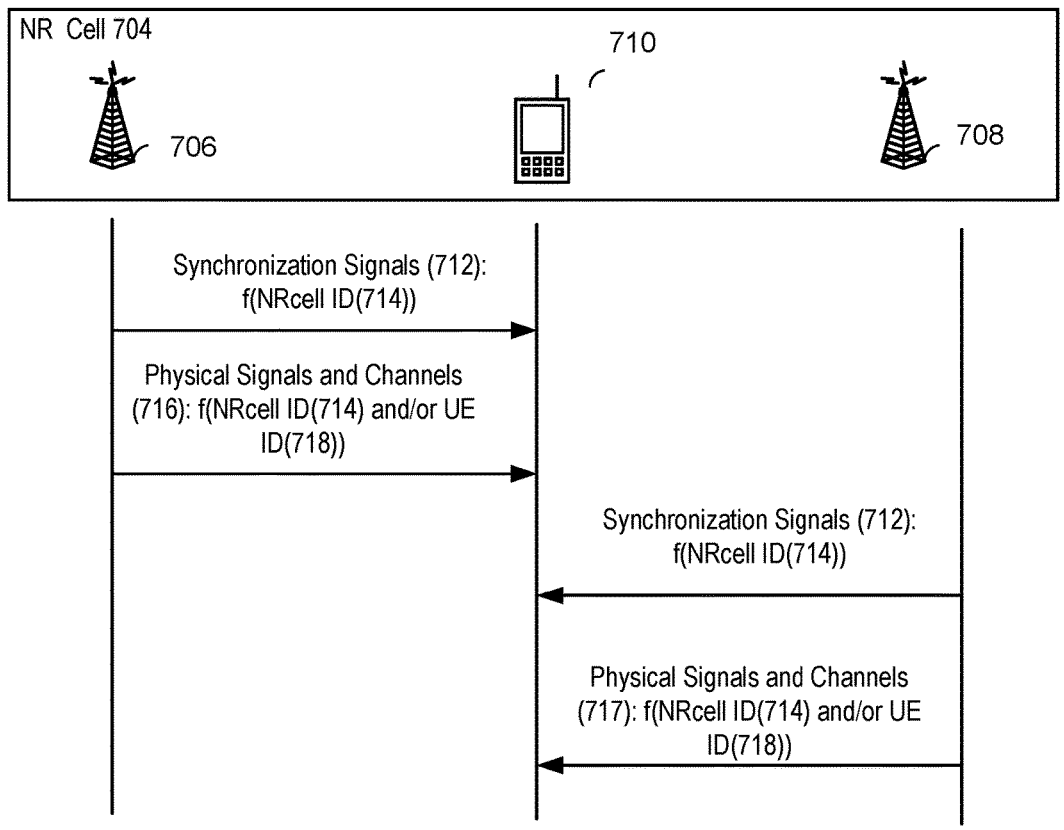
FIG. 7 illustrates synchronization signals and physical signals and channels being transmitted in one NR Cell of a NR network in accordance with the present disclosure.

In the case of an NR Cell, as shown FIG. 7, when UE 710 switches from communicating with one or more transmit/receive points 706 (only one shown) to communicating with one or more transmit/receive points 708 (only one shown), in NR Cell 704, the NR Cell ID and UE specific parameter (e.g. UE ID) do not change. As such, UE 710 can avoid having to synchronize to new synchronization signals, and transmit/receive point(s) 708 and UE 710 can avoid having to provision and receive, respectively, the physical signals and channels in accordance with a new Cell ID and/or a new UE specific parameter, such as a new UE ID. For example, as shown in FIG. 7, both transmit/receive point(s) 706 and transmit/receive point(s) 708 transmit synchronization signals 712 whose provisioning is a function of NR Cell ID 714, and physical signals and channels 716 and 717 whose provisioning are a function of NR Cell ID 714, and/or UE ID 718.

Figure 8:
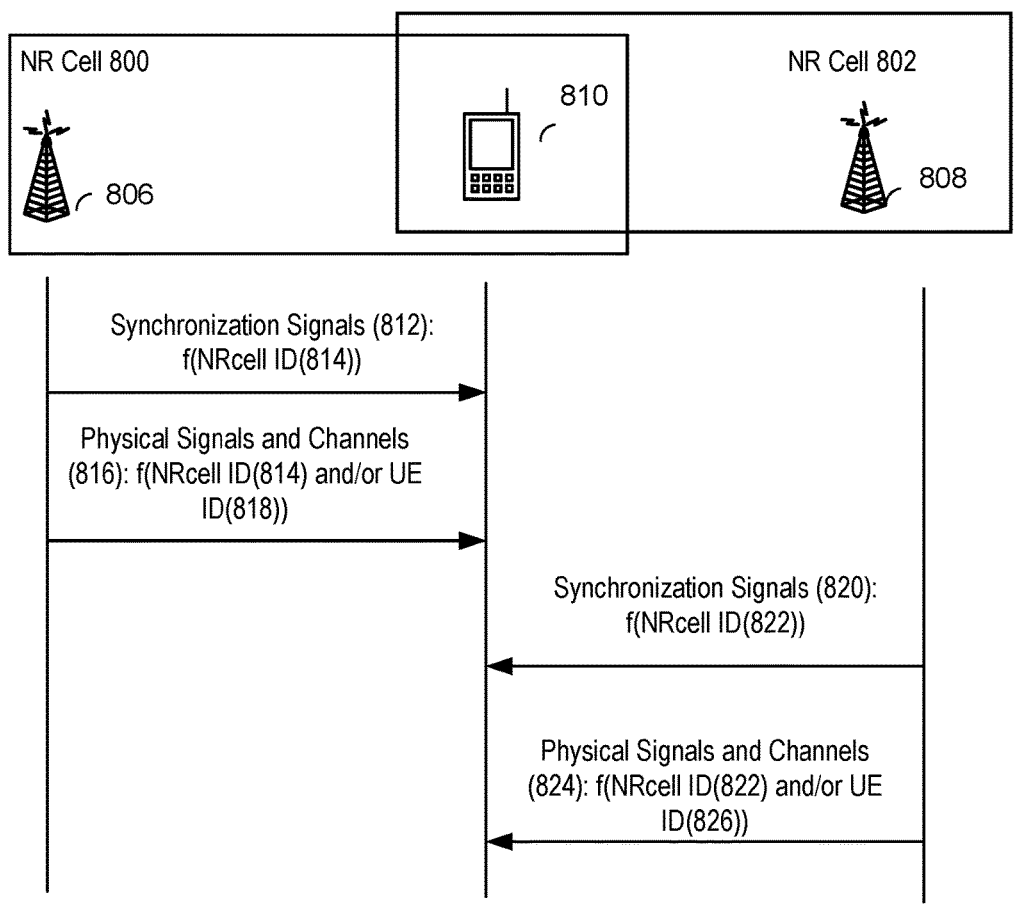
FIG. 8 illustrates synchronization signals and physical signals and channels being transmitted in two NR Cells of a NR network in accordance with the present disclosure.

The problem of changing NR Cell IDs and/or UE IDs or other UE specific parameters persists, however, in the case of a UE switching between NR Cells. For example, as shown in FIG. 8, when UE 810 switches from communicating with one or more transmit/receive points 806 (only one shown) of NR Cell 800, to communicating with one or more transmit/receive points 808 (only one shown) of different NR Cell 802, the NR Cell ID and UE ID change once again. As a result, UE 810 must go from being synchronized to synchronization channel 812 based on NR Cell ID 814, and receiving physical signals and channels 816 provisioned in accordance with NR Cell ID 814 and/or UE ID 818 assigned by the network, such as by an entity associated with NR Cell 800 (including but not limited to one or more transmit/receive points and/or access units), to synchronizing to synchronization channel 820 based on NR Cell ID 822 and receiving physical signals and channels 824 provisioned in accordance with NR Cell ID 822 and/or UE ID 826 assigned by the network, such as by an entity associated with NR Cell 802 (including but not limited to one or more transmit/receive points and/or access units). Once again this wastes spectral resources, increases latency and increases processing.

Figure 9:
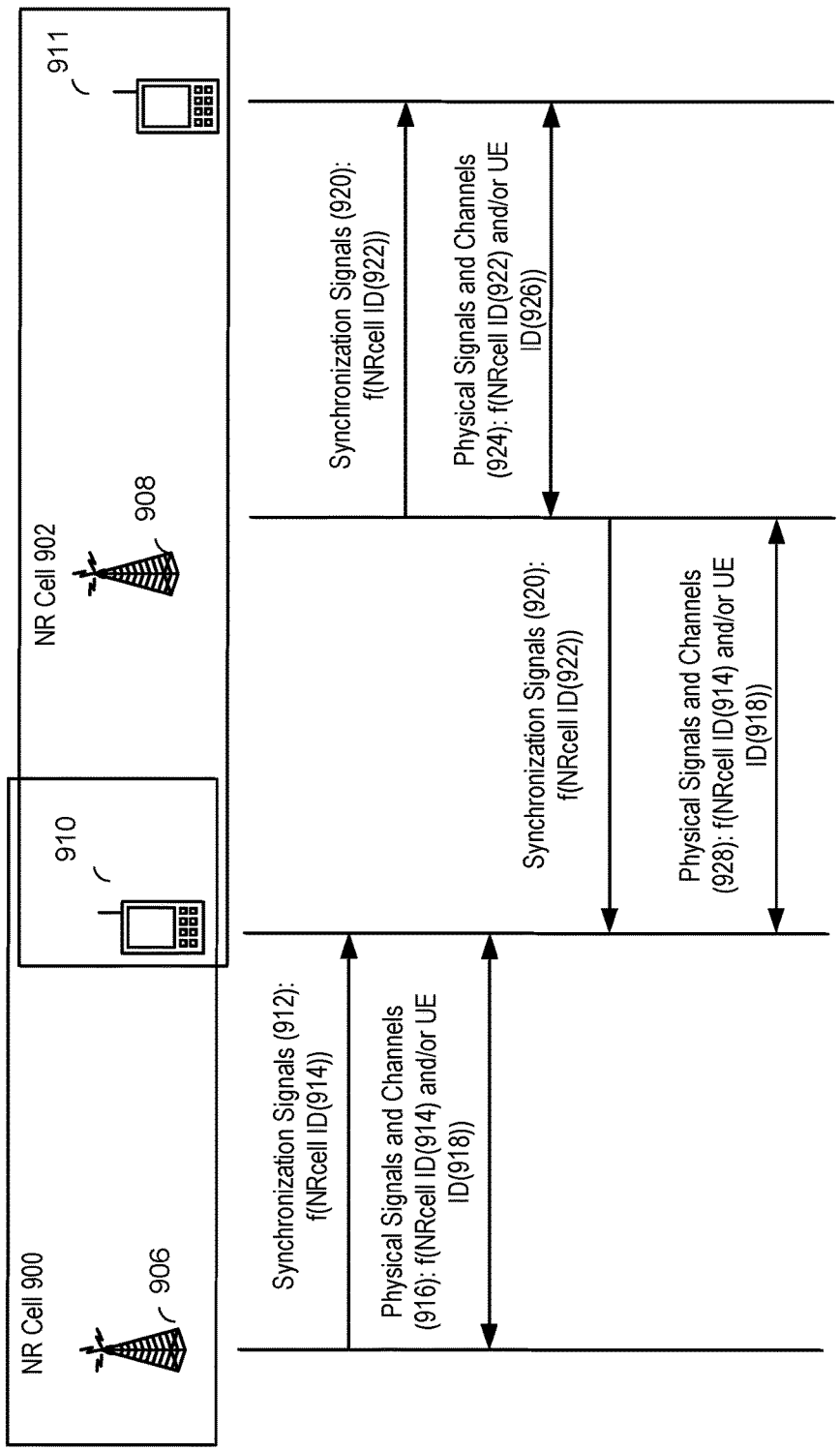
FIG. 9 illustrates synchronization signals and physical signals and channels being transmitted in two NR Cells of a NR network in accordance with the present disclosure in accordance with the present disclosure.

One embodiment for addressing the aforementioned problem is described below in conjunction with FIG. 9. As shown therein, one or more transmit/receive points 906 (only one shown) associated with NR Cell 900, transmit synchronization signals 912 based on NR Cell ID 914, and communicate with UE 910 physical signals and channels 916 provisioned based on NR Cell ID 914 and/or a UE specific parameter which in this example is UE ID 918 of UE 910, assigned by the network, such as by an entity associated with NR Cell 900 (including but not limited to one or more transmit/receive points and/or access units). Also shown therein, one or more other transmit/receive points 908 (only one shown) associated with different NR Cell 902 transmit synchronization signals 920 based on NR Cell ID 922, and communicate with UE 911 physical signals and channels 924 provisioned based on NR Cell ID 922 and/or a UE specific parameter, in this example UE ID 926 of UE 911, assigned by the network, such as by an entity associated with NR Cell 902 (including but not limited to one or more transmit/receive points and/or access units). When UE 910 begins communicating with transmit/receive point(s) 908, however, for example as part of a handover from NR Cell 900 to NR Cell 902, UE 910 receives synchronization signals 920 based on NR Cell ID 922. But instead of communicating physical signals and channels that are provisioned based on NR Cell ID 922 and/or a newly assigned UE ID or other UE specific parameters assigned by the network, such as by an entity associated with NR Cell 902 (including but not limited to one or more transmit/receive points and/or access units), NR Cell ID 914 and/or UE ID 918 that were previously assigned by the network, such as by an entity associated with NR Cell 900 (including but not limited to one or more transmit/receive points and/or access units). This allows UE 910 to avoid having to obtain a new UE ID from the network and avoids the network and UE from having to provision and communicate physical signals and channels provisioned in accordance with different IDs. The synchronization signals may be transmitted in an SS block. The physical signals can include broadcast channels that are a function of Cell ID. The benefit is that the mobility interruption due to reconfiguration of physical signals and channels is minimized. This results in reducing latency and processing.

Figure 10:
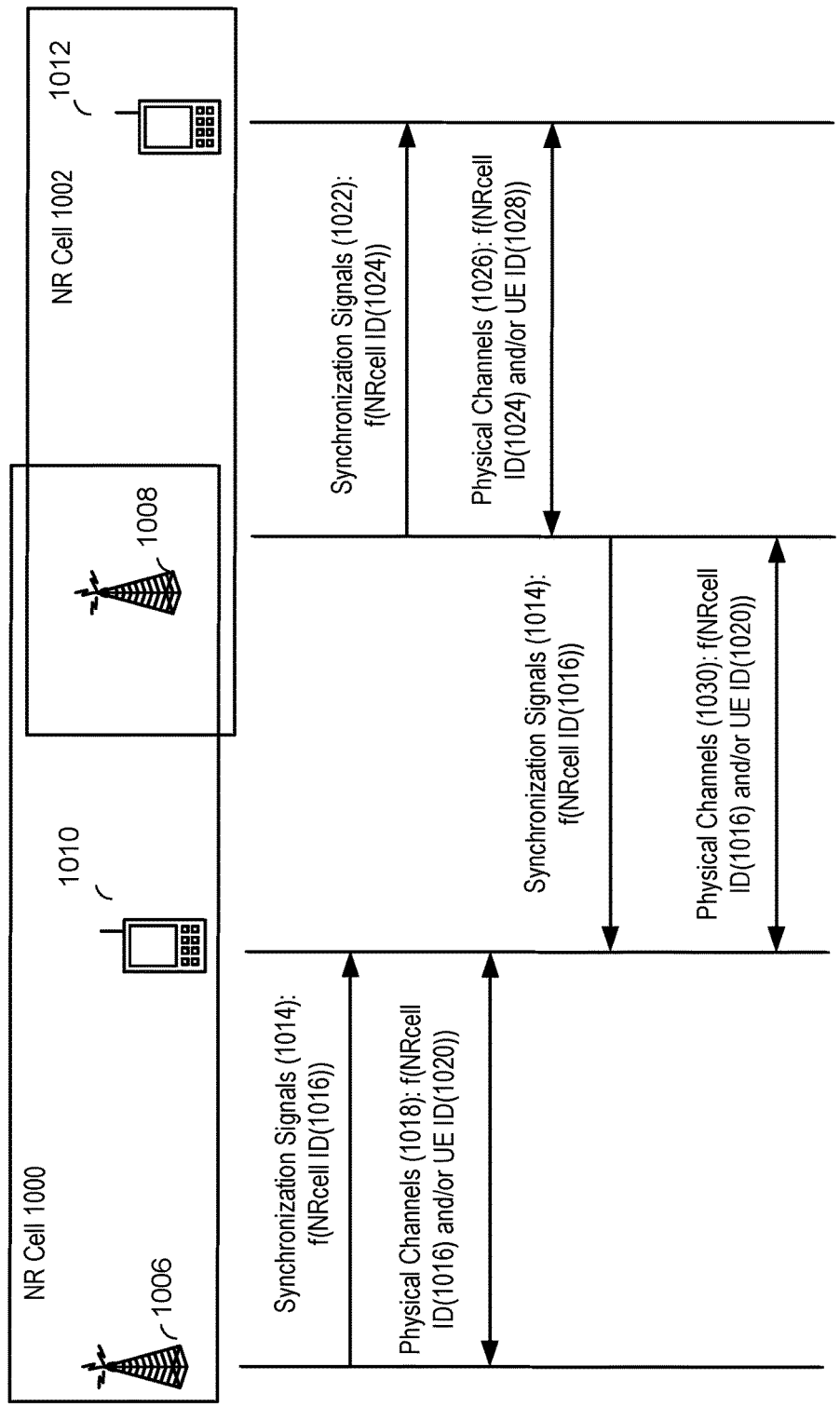
FIG. 10 illustrates synchronization signals and physical signals and channels being transmitted in two NR Cells of a NR network in accordance with the present disclosure in accordance with the present disclosure.

Another embodiment for addressing the aforementioned problem is described below in conjunction with FIG. 10. As shown therein, one or more transmit/receive points 1006 (only one shown) associated with NR Cell 1000 transmit synchronization signals 1014 based on NR Cell ID 1016, and communicate with UE 1010 physical signals and channels 1018 provisioned based on NR Cell ID 1016 and/or UE ID 1020 or another UE specific parameter assigned by the network, such as an entity associated with NR Cell 1000 (including but not limited to one or more transmit/receive points and/or access units). Also shown in FIG. 10, one or more transmit/receive point(s) 1008 associated with different NR Cell 1002 transmit synchronization signals 1022 based on NR Cell ID 1024 and communicate with UE 1012 physical signals and channels 1026 provisioned based on NR Cell ID 1024 and/or UE ID 1028 or another UE specific parameter assigned by the network, such as an entity associated with NR Cell 1002 (including but not limited to one or more transmit/receive points and/or access units). When UE 1010 begins communicating with transmit/receive point(s) 1008, however, for example as part of a handover from NR Cell 1000 to NR Cell 1002, UE receives, from transmit/receive point(s) 1008, synchronization signals 1014 provisioned based on NR Cell ID 1016 and communicates physical signals and channels 1030 provisioned based on NR Cell ID 1016 and/or UE ID 1020 or another UE specific parameter assigned by the network, such as an entity associated with NR Cell 1000 (including but not limited to one or more transmit/receive points and/or access units). In addition to avoiding having to obtain a new UE ID from the network, and avoiding the network and UE having to provision and communicate physical signals and channels provisioned in accordance with different UE IDs respectively, this approach also avoids the need for UE 1010 to synchronize to a new synchronization channel. Therefore this approach further reduces latency and processing. It also minimizes mobility interruption due to reconfiguration of physical signals and channels. The synchronization signals may be transmitted in an SS block. The transmit/receive point(s) 1008 may transmit synchronization signals 1022 based on NR Cell ID 1024 and synchronization signals 1014 based on NR Cell ID 1016 in SS blocks that are in different time, frequency and/or code resources. For example, two different frequency resources (e.g. subbands) can be configured by the network to carry SS blocks with synchronization signals 1022 and SS blocks with synchronization signals 1014 respectively. In another example, SS blocks with synchronization signals 1022 are transmitted in one or more time slots and SS blocks with synchronization signals 1014 are transmitted in another sets of time slots. The physical signals can include broadcast channels that are a function of Cell ID.

In one embodiment, in the process of handing over a UE from one NR Cell to another NR Cell, such handover procedure as described above in conjunction with various embodiments may apply to a certain communication direction (e.g. uplink or downlink) only and not the other direction. That is to say, only one of DL or UL channels and/or signals use the IDs associated with a source NR Cell, whereas for the other direction the IDs associated with target NR Cell are used. Similarly, handover may apply to a certain subset of physical signals and/or channels but not necessarily all of the physical signals and/or channels. For example, a UE performing a handover may still receive a physical control channel from the source NR Cell and data channels from the target cell or vice versa.

For UEs in connected mode, the NR system may rely on measurement reports, for example reference signal received power (RSRP) reports based on UE-specific reference signals (e.g. CSI-RS), to determine whether it should hand over UEs from one NR-cell to the other. For example, measurement reports by the UEs based on channel state information reference signals (CSI-RSs) may be used by the NR system in addition to RSRP reports based on the synchronization signals detected by the UEs. A CSI-RS sequence can be generated according to a configurable UE-specific parameter (e.g. UE ID, configurable ID, etc), instead of NR Cell ID such that in handover scenarios CSI-RS configuration can be based on the same UE-specific parameter when the UE moves from the source NR Cell to the target NR Cell. In other embodiments, other UE-specific CSI-RS configuration parameters such as CSI-RS resource and port configuration parameters may also be shared between the source and target NR-cells in order to save (re)configuration resource overhead during handover procedure between NR-cells.

Figure 11:
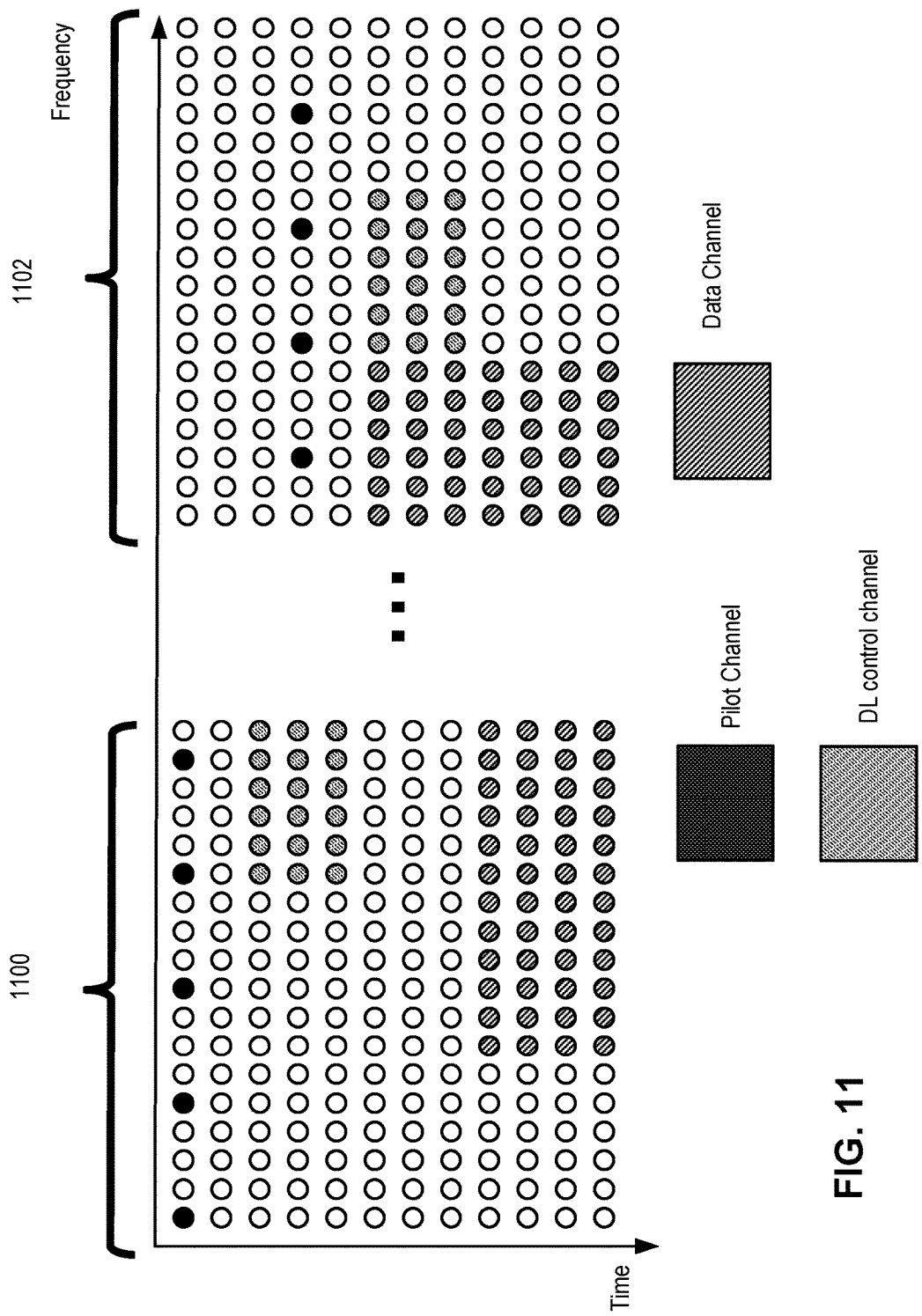
FIG. 11 illustrates physical signal and channel mapping of physical signals and channels being transmitted in two NR Cells of a NR network in accordance with the present disclosure.

One embodiment for implementing one or more transmit/receive points in an NR Cell, so as to support physical signals and channels provisioned in accordance with NR Cell IDs and/or UE IDs or other UE specific parameters associated with different NR Cells, is shown in FIG. 11. As shown therein physical signals and channels provisioned in accordance with NR Cell ID of NR Cell 1 and/or UE specific parameters, such as a UE ID, assigned by the network, such as an entity associated with NR Cell 1, are communicated by the one or more transmit/receive points in designated frequency range 1100, whereas physical channels provisioned in accordance with a NR Cell ID of NR Cell 2 and/or UE specific parameters, such as UE IDs, assigned by the network, such as an entity associated with the NR Cell 2, are communicated by the transmit/receive point(s) in designated frequency range 1102. Though not shown in FIG. 11 the scrambling applied and/or sequence to be used for generating these various physical signals and channels can also change, with or without the physical mappings changing.

Figure 12:
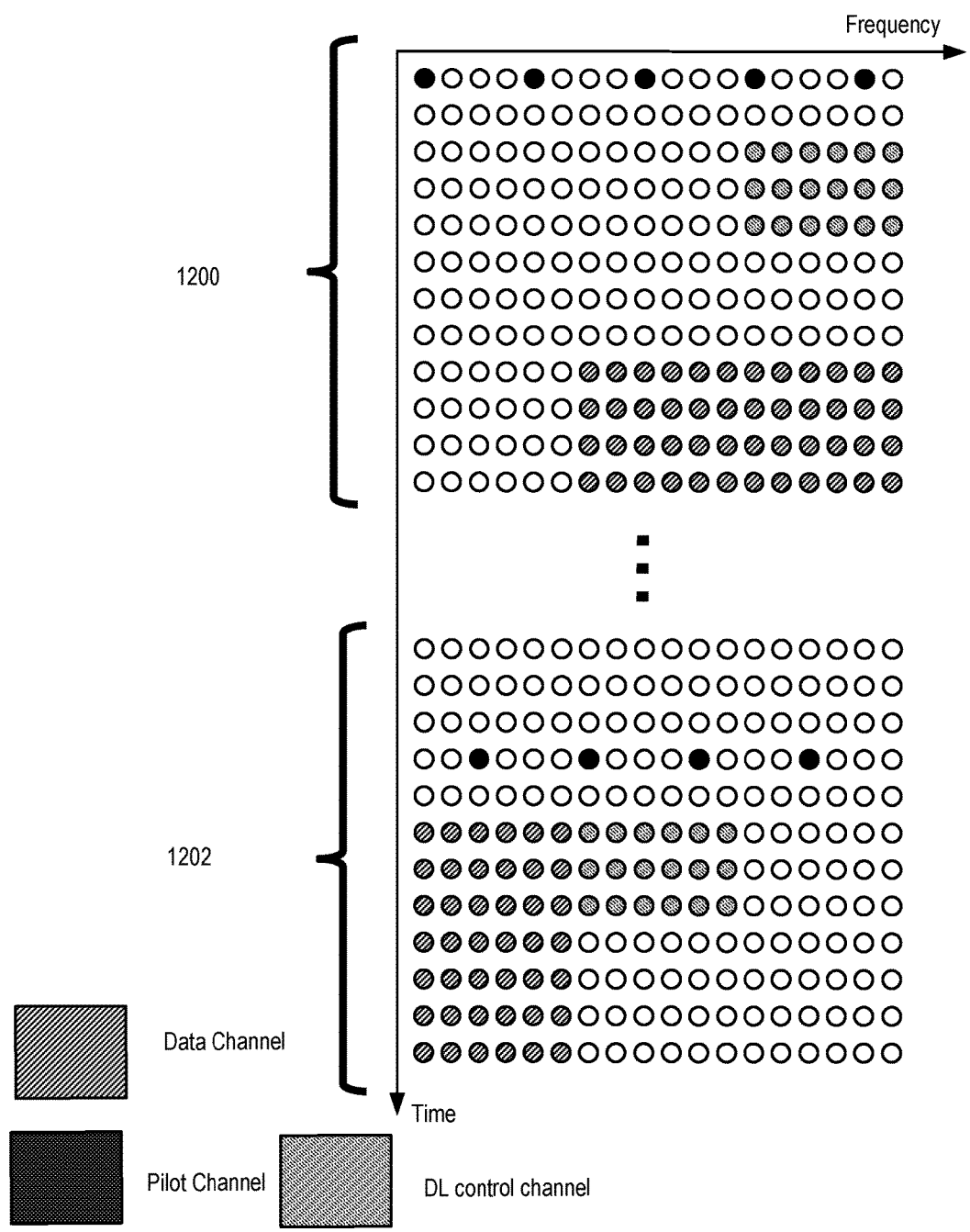
FIG. 12 illustrates physical signal and channel mapping of physical signals and channels being transmitted in two NR Cells of a NR network in accordance with the present disclosure.

Another embodiment for implementing one or more transmit/receive points in an NR Cell, so as to support physical signals and channels provisioned in accordance with NR Cell IDs and UE specific parameters associated with different NR Cells, is shown in FIG. 12. As shown therein physical channels provisioned in accordance with a NR Cell ID of NR Cell 1 and/or UE specific parameters, such as UE IDs, assigned by the network, such as an entity associated with NR Cell 1, are communicated by the one or more transmit/receive points in designated time range 1200, whereas physical channels provisioned in accordance with a NR Cell ID of NR Cell 2 and/or UE specific parameters such as UE IDs, assigned by the network, such as an entity associated with the NR Cell 2, are communicated by the transmit/receive point(s) in designated time range 1202. Though not shown in FIG. 12 the scrambling applied and/or sequence to be used for generating these various physical signals and channels can also change, with or without the physical mappings changing.

Figure 13:
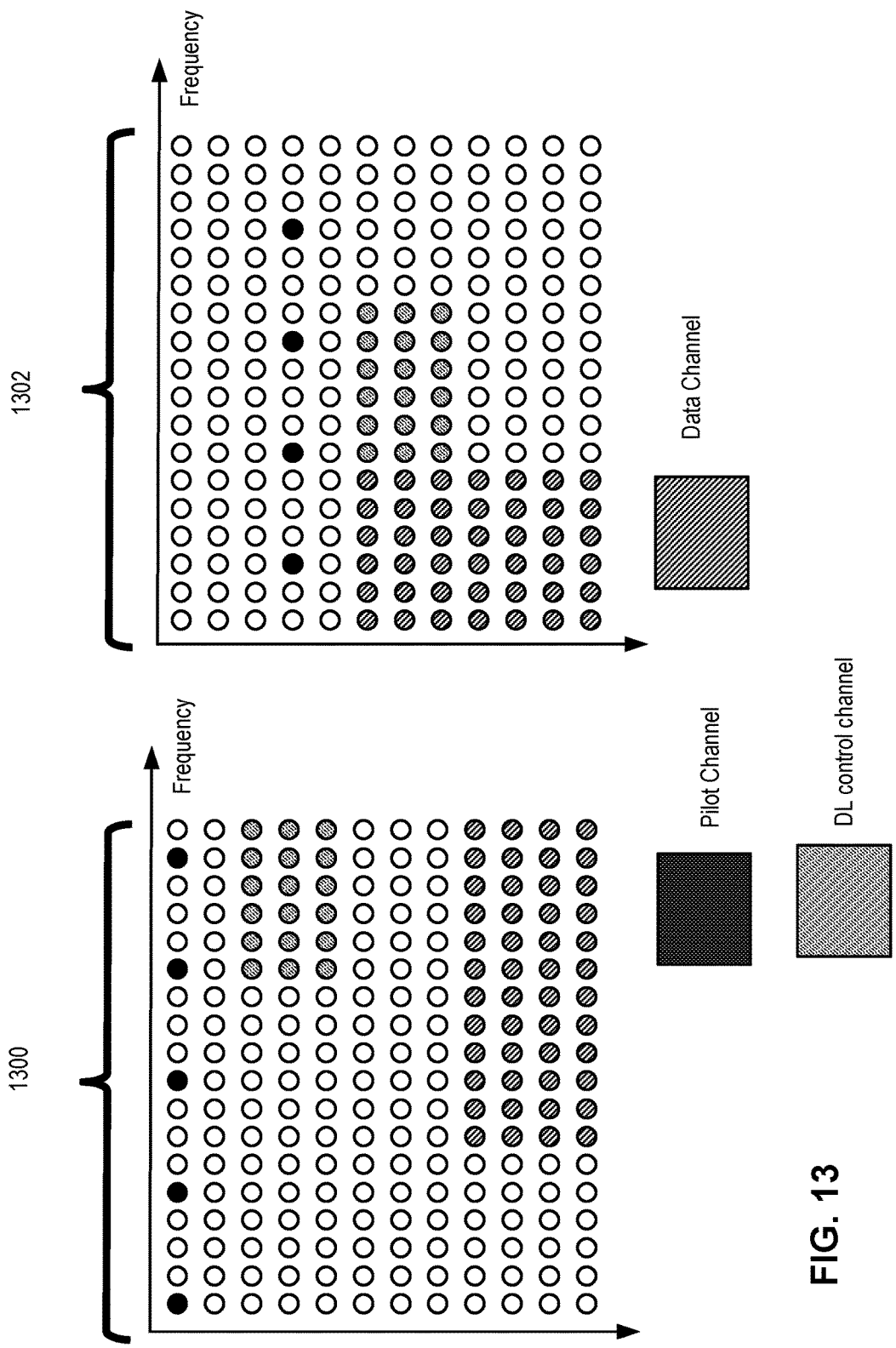
FIG. 13 illustrates physical signal and channel mapping of physical signals and channels being transmitted in two NR Cells of a NR network in accordance with the present disclosure.

Another embodiment for implementing one or more transmit/receive points in an NR Cell, so as to support physical signals and channels provisioned in accordance with NR Cell IDs and UE IDs associated with different NR Cells, is presented in the context of carrier aggregation as shown in FIG. 13. As shown therein physical signals and channels provisioned in accordance with a NR Cell ID of NR Cell 1 and/or UE specific parameters, such as UE IDs, assigned by the network, such as an entity associated with NR Cell 1, are communicated by the one or more transmit/receive point(s) in designated carrier frequency range 1300, whereas physical channels provisioned in accordance with a NR Cell ID or NR Cell 2 and/or UE specific parameters, such as UE IDs, assigned by the network, such as an entity associated with the NR Cell 2, are communicated by the transmit/receive point(s) in designated carrier frequency range 1302. According to one embodiment, a carrier frequency range is a frequency bandwidth over which an NR Cell can operate. Carrier aggregation corresponds to bandwidth extension by aggregating component carriers (CC), e.g. where a CC is a frequency range corresponding to a certain carrier frequency, in both DL and UL. Symmetric or asymmetric DL/UL CA configurations are possible. Motivation for carrier aggregation include achieving higher peak data rates, facilitating efficient use of fragmented spectrum and enabling higher data rates in typical deployments where contiguous spectrum is not an option.

The aforementioned designated frequency ranges, time ranges and carrier frequency ranges can be designated in the sense that they are intended or reserved for communications provisioned in accordance with NR Cell IDs of, and/or UE IDs or other UE specific parameters used or assigned by, respective NR Cells.

Figure 14:
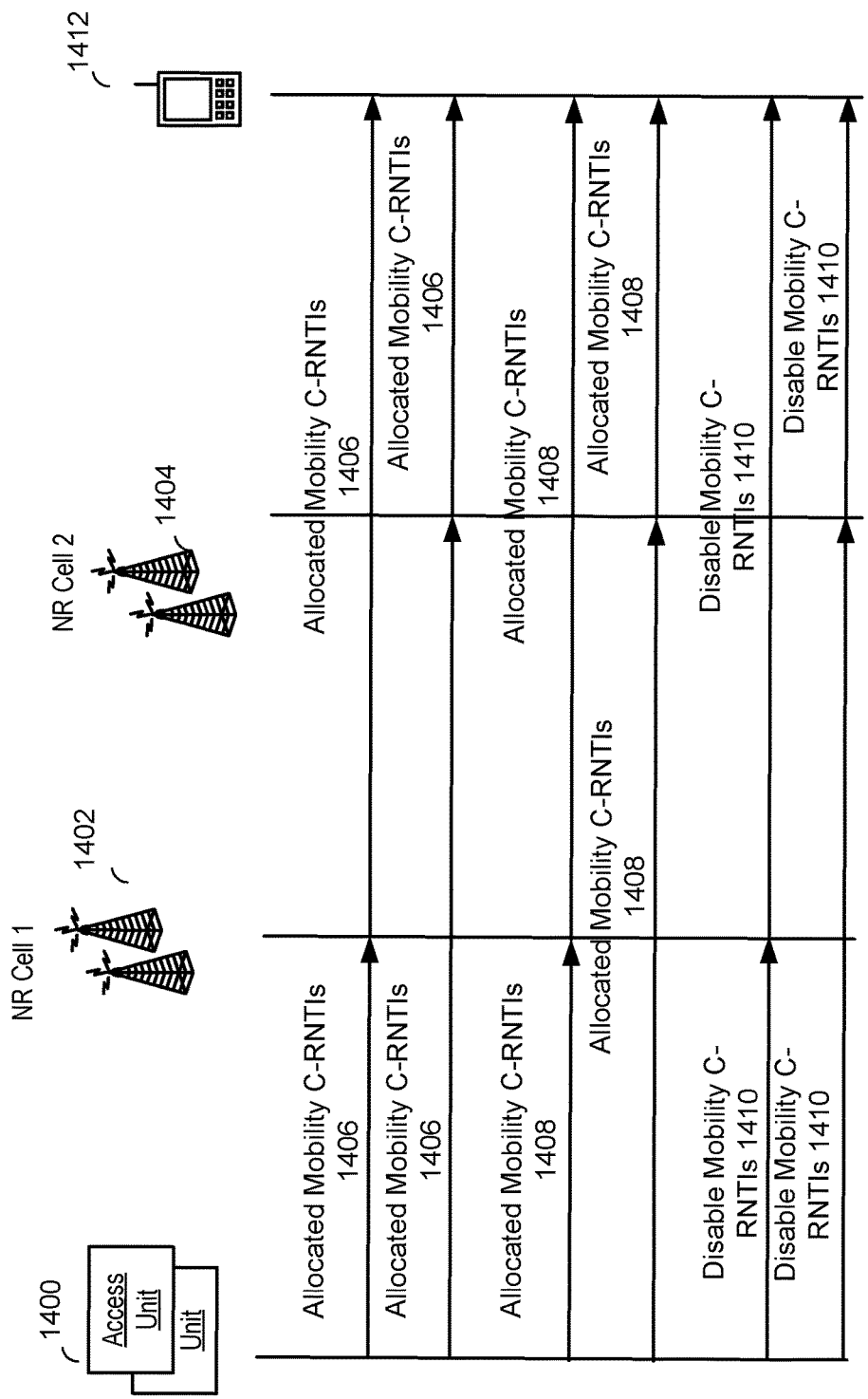
FIG. 14 illustrates the allocation of Mobility UE IDs in accordance with the present disclosure.

According to one embodiment of an NR system, a subset of UE identities (e.g. Cell Radio Network Temporary Identifier (C-RNTI), NR C-RNTI), from a pool of UE identities (e.g. RNTI) can be pre-allocated or reserved by the NR system for mobility purposes. More specifically, these identities can be used to identify certain UEs for which, when transitioning to another NR Cell, these UE ID will not change, at least not initially. For example, the UE ID might not change when the UE is within a transition area between two overlapping NR Cells and/or when communicating with a specific subset of TRPs of one or more NR Cells. In such cases the UE may maintain connection with both the source and target cells for dual connectivity. Once the UE moves further into the new NR Cell, for example, a new UE ID may be assigned by the new NR Cell. That is to say, the channels or signals will be provisioned, by the target NR Cell into which the UE moves, using the UE ID assigned by a previous NR Cell, whereas for other UEs, they will have an identity that will require the UEs to obtain a new UE ID and communicate using signals and channels associated with parameters assigned by the NR Cell into which the UE move. These "Mobility C-RNTI" values (or more generally "Mobility UE IDs") can be configured by the network and signaled or otherwise indicated to UEs in the NR Cells. Further, use of these Mobility C-RNTI values can be enabled/disabled including by signaling to UEs in the NR Cells UEs. In some instances, whether the Mobility C-RNTI values are being used need not be known by the UEs, however, it may be known by the network entities of neighboring NR Cells that assign the RNTI to UEs. In such a case signaling exchange between TRPs may be used. In another embodiment, Mobility C-RNTI values are not fixed but can be dynamically added (additional Mobility C-RNTI/UE IDs)/removed based on the UE's in the system. For example, as shown in FIG. 14, one or more access units 1400 can indicate to one or more TRPs 1402 (which could be one or more gNodeBs) of one NR Cell, and/or to one or more TRPs 1404 of another NR Cell, allocated Mobility C-RNTI values 1406. These values may also be optionally indicated, by TRPs 1402 and/or 1404, to UE 1412. Additionally, one or more access units 1400 can update the Mobility C-RNTI values that can be used by sending allocated Mobility C-RNTI values 1408 to TRPs 1402 and/or 1404. This can be done by sending an entirely new indication of Mobility C-RNTI values that can be used, or an update to a previous indication. Furthermore, as shown in FIG. 14, one or more of access units 1400 can disable use of the Mobility C-RNTI values sending disable Mobility C-RNTI messages 1410 to TRPs 1402 and/or 1404. That use of Mobility C-RNTI values are disabled can be optionally further indicated by TRPs 1402 and 1404 to UE 1412. As will be appreciated, the number of TRP's communicating per NR Cell in FIG. 14 is merely for purposes explanation and not limiting. Similarly, there could be more or less access units 1400 used to communicate with the NR Cells.

The subset of UE identities that can be pre-allocated/pre-configured may be defined by a table specified in the standard. For example, the number of UE identities set aside for this purpose can be in the range of tens of IDs. For example, as shown in FIG. 15, some RNTI values Mobility C-RNTI (from FFDC-FFF3) are set aside for sharing by neighboring NR Cells. There are 23 values in this example. Such Mobility C-RNTI values could be used across more than one NR Cell, even though only two are shown in the Figures, and could even be used as a globally unique identifier for use across all NR Cells.

Figure 16:
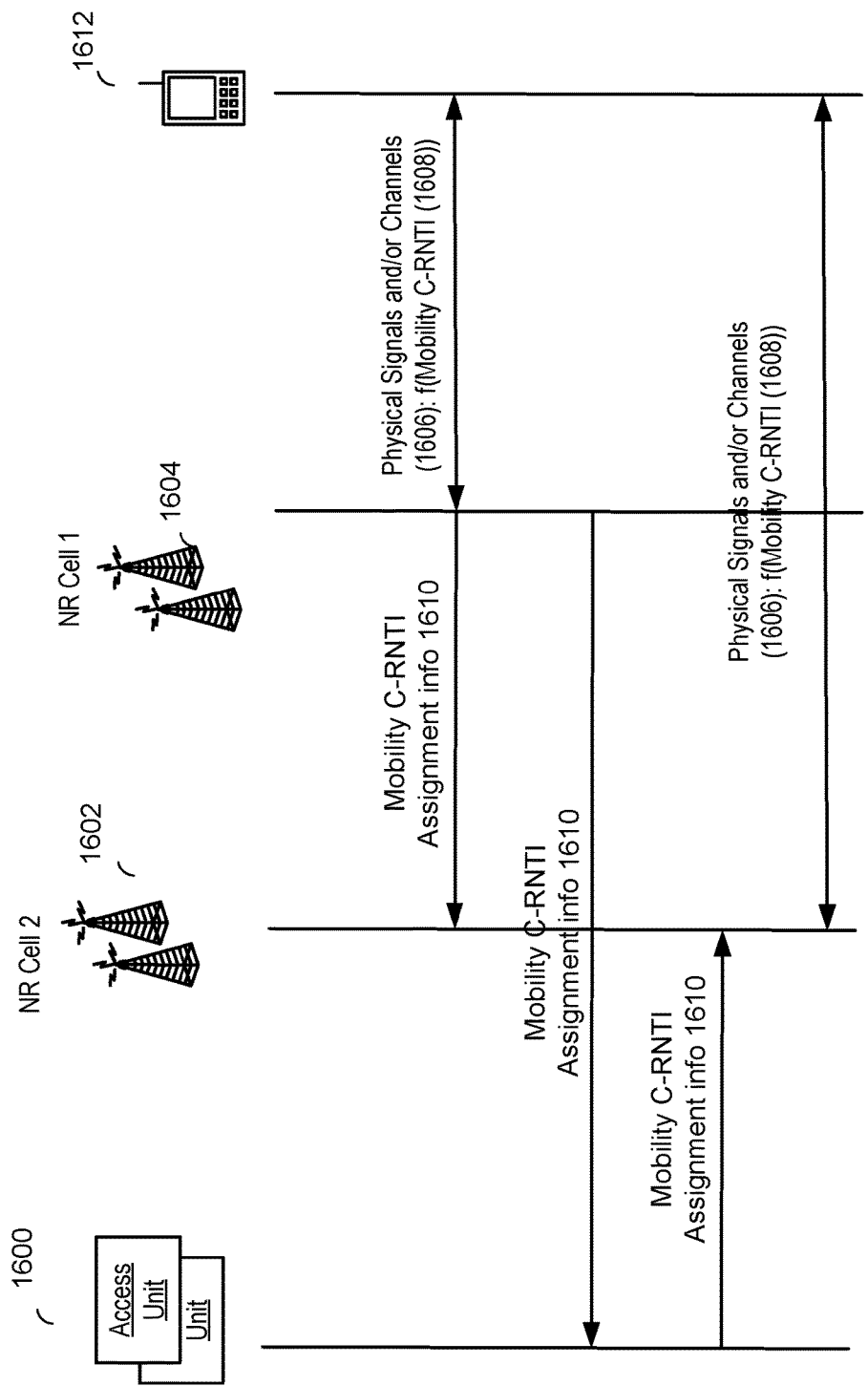
FIG. 16 illustrates an example of Mobility UE ID allocation in accordance with the present disclosure.

FIG. 16 shows UE 1612 communicating with TRPs 1604 (which could be one or more gNodeBs) of a first source NR Cell, wherein physical signals and/or channels 1606 are provisioned in accordance with Mobility C-RNTI 1608 and/or NR Cell ID (not shown). Information 1610 regarding such a Mobility C-RNTI being assigned can be sent directly to TRPs 1602 of another NR Cell (which can be a subset of one or more TRPs of the other NR Cell) from TRPs 1604, or indirectly via access units 1600. At a later point in time, TRPs 1602 of the other NR Cell can communicate with UE 1612 using physical signals and/or channels 1606 provisioned in accordance with the Mobility C-RNTI 1608. The information sent from one NR Cell to another can include information regarding actual Mobility C-RNTIs assigned, or more generally that such ID's have been assigned, but without necessarily specifying which ones. Note, information regarding use or assignment of Mobility C-RNTI's can be sent to another NR Cell before, after or at the same time as physical signals or channels provisioned in accordance with such Mobility C-RNTIs.

Figure 17:
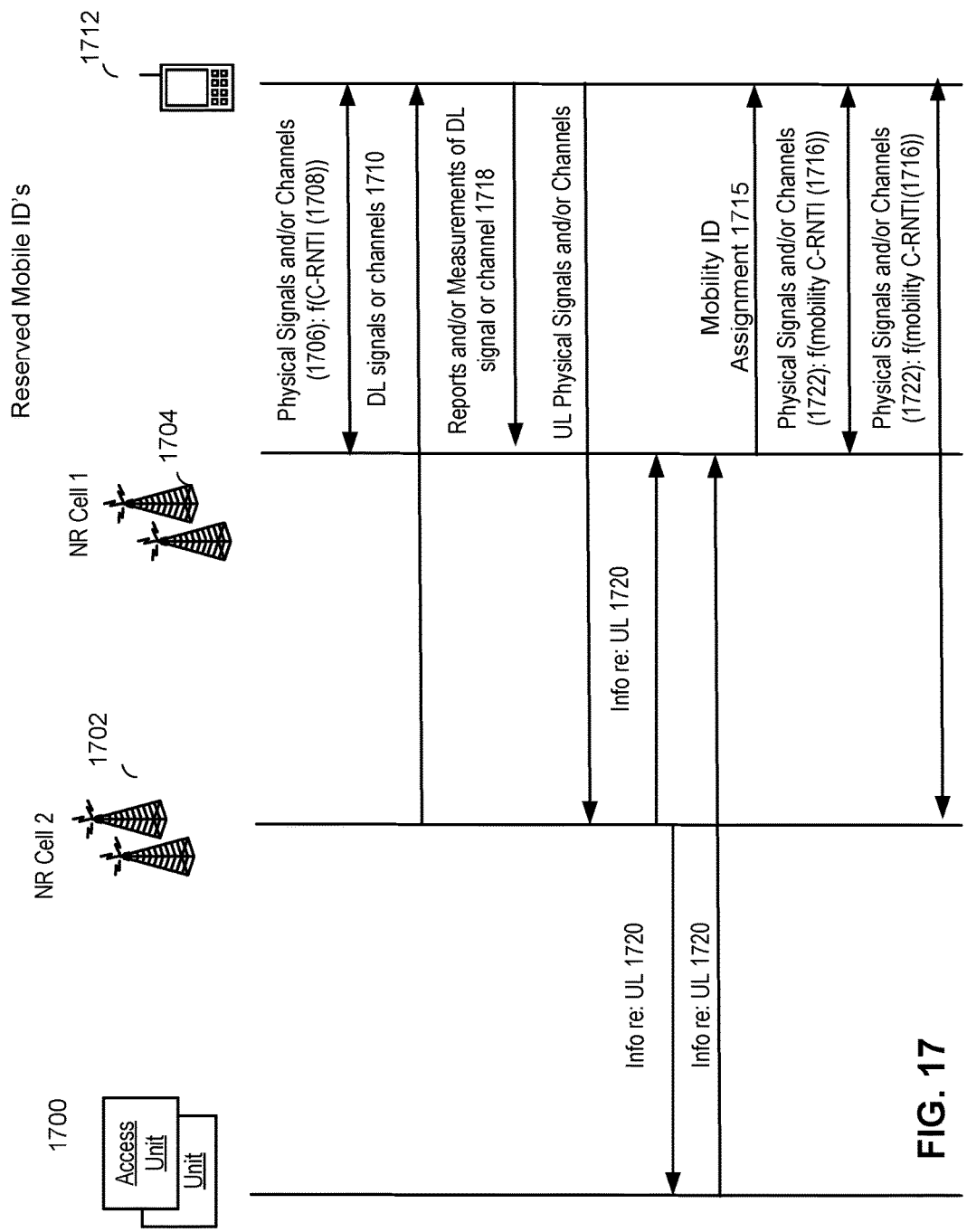
FIG. 17 illustrates an example of Mobility UE ID assignment in accordance with the present disclosure.

FIG. 17 shows an example of assigning/re-assigning UE IDs (e.g. C-RNTI) in an NR system in a situation where a UE moves to a transition area between two NR Cells (for example, a coverage area of a certain subset of one or more TRPs of an NR Cell). Such assignment/re-assignment can be based on DL and/or UL based reports and/or measurements. As shown, UE 1712 communicates physical signals and/or channels 1706 provisioned in accordance with C-RNTI 1708 with TRPs 1704 (which could be one or more gNodeBs) of a source NR Cell. Based on DL signals and/or channels 1710 received by UE 1712 from the target NR Cell and/or reports and/or measurements based UL signals 1714 received at TRPs 1702 of the target NR Cell, the NR system assigns, via assignment 1715, Mobility C-RNTI 1716 to UE 1712. With respect to DL signals and/or channels 1710, report and/or measurements 1718 can be sent by UE 1712 to TRPs 1704 of the source NR Cell. With respect to the reports and/or measurements based on UL signals received at TRPs 1702 of the target NR Cell, such information 1720 can be sent to TRPs 1704 of the source NR Cell either directly or indirectly via one or more of access unit 1700. After being assigned Mobility C-RNTI 1716, UE can communicate physical signals and/or channels with TRPs 1704. Subsequently, as part of a handover to the target NR Cell, TRPs 1702 can communicate with UE 1712 physical signals and/or channels 1722 provisioned in accordance with Mobility C-RNTI 1716. That Mobility ID 1716 has been assigned can be indicated to TRPs 1702 in a manner similar to that set out in FIG. 16.

According to one embodiment based on DL based assessments, when a UE in an Active state the UE performs Radio Resource Management (RRM) measurements of neighboring NR Cells. The UE then reports measurements and/or a report to the source NR Cell. The NR system (e.g. via one or more access units and/or TRPs) then determines that the UE is in the transition area. The determination may be based on the measurement reports from the UE. For example, a measurement threshold is configured by the network (e.g. via one or more access units and/or transmit and receive points) and signaled to the UE via Radio Resource Control (RRC) signaling. The threshold represents the received signal quality that will trigger the UE to report measurements (i.e. if the received signal quality of a neighboring NR Cell is above the threshold, the UE will report the measurement). This threshold maybe different from the threshold used for regular handover procedure. For instance, the threshold may be lower than that of the threshold used for regular handover to provide a more seamless mobility experience for a UE. In other cases, the threshold may be the same (e.g. only one threshold is defined for both). In another example, a UE reports the measurements of neighboring cells without being triggered by a threshold and the network (e.g. one or more access units and/or TRPs) makes the determination of whether the UE is in the transition area and needs to be assigned with the Mobility C-RNTI. The NR system can then signal to the UE (e.g. via RRC signaling) a new C-RNTI assignment taken from the Mobility C-RNTI values. As an example, a new RRC procedure can be defined where the network sends to the UE an RRC signaling message to reconfigure the UE identity. The message contains the new C-RNTI. The procedure is completed by the UE sending an RRC complete message. Another example is that it can be part of the RRC reconfiguration procedure. The RRC reconfiguration message includes an additional field containing the new C-RNTI. Alternatively, the NR system can inform the UE of the dedicated preamble for contention-free access. During the contention-free access procedure, the NR system (e.g. via one or more access units and/or TRPs) assigns the Mobility C-RNTI to the UE. In yet another embodiment, the UE can perform a contention-based access procedure and the NR system can assign the Mobility C-RNTI to the UE during the procedure. In the random access procedure (contention-free or contention-based), the Mobility C-RNTI is included in the MAC layer protocol data unit (PDU) such as the Random Access Response (RAR).

According to another embodiment based on DL based assessments, when a UE is in an Idle state, the UE performs Idle mode cell (re)-selection based on UE's RRM measurements of neighboring NR Cells. And when a UE performs initial access procedure, the NR system assigns a Mobility C-RNTI based on the TRP's that receive the PRACH preamble.

According to another embodiment based on DL based assessments, when a UE in an Inactive state, the UE already maintains a C-RNTI. In such a case the procedure can be similar to that described above when a UE in Active mode. An alternative embodiment is the procedure can be similar to UE in Idle mode. The initial access procedure can make use of the 2-step RACH procedure due to the availability of a C-RNTI.

According to one embodiment based on UL based assessments, when a UE is in an Active state, the UE is configured by the network to send UL Sounding Reference Signals (SRS). The UE then transmits UL SRS according to configuration and UL data in UL physical data channel. Based on measurements or assessments of these UL transmissions, the NR system (e.g. via one or more access units and TRPs) determines that the UE is in the transition area. The NR system may then signal to the UE (e.g. via RRC signaling) a new C-RNTI assignment taken from the Mobility C-RNTI values. Alternatively, the NR system can inform the UE the dedicated preamble for contention-free access. During the contention-free access procedure, the NR system can assign the Mobility C-RNTI to the UE.

According to another embodiment based on UL based assessments, when UE in an Inactive state, the UE already maintains a C-RNTI. In such instances, the procedure can be similar to that used for the UE in Active mode. An alternative embodiment is the procedure can be similar to UE in Idle mode, where the initial access procedure can make use of the 2-step RACH procedure due to the availability of a C-RNTI.

Figure 18:
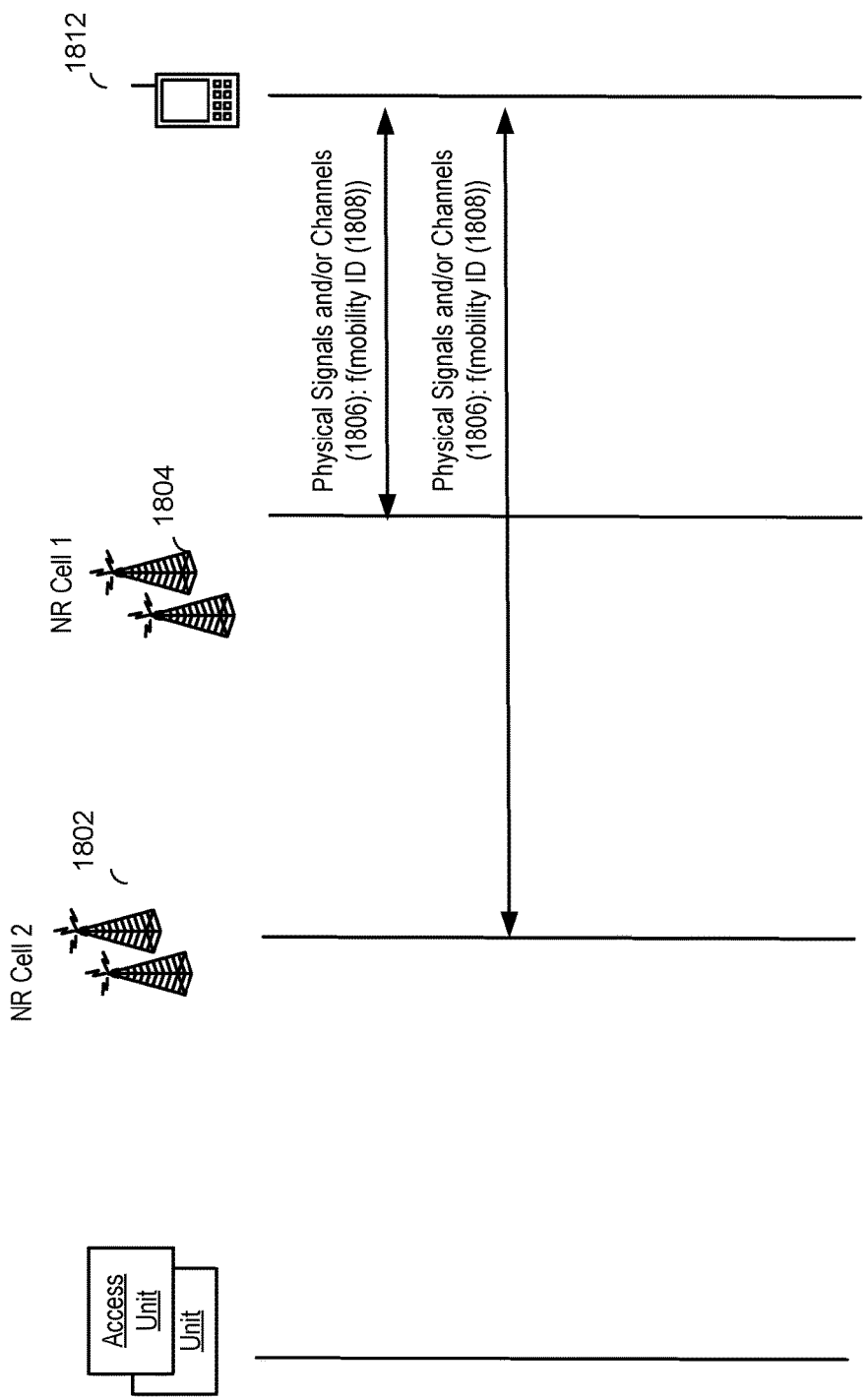
FIG. 18 illustrates an example of Mobility UE ID assignment in accordance with the present disclosure.

According to an embodiment, a UE's UE ID (e.g. C-RNTI) may be assigned based on a UE type. For example, a UE type can be based on whether the UE is fixed (e.g. smart utility meters) or mobile. Alternatively, a UE incorporated into a train or other vehicles likely to be mobile can be assigned the mobility C-RNTI during the initial access procedure. An embodiment of such an approach is shown in FIG. 18 wherein physical signals or channels 1806 used by UE 1812 for purposes of communicating with TRPs 1804 of an NR Cell are provisioned in accordance with a Mobility C-RNTI 1808 following initial access. The same Mobility C-RNTI 1808 can then be used by TRPs 1802 (which can be a subset of one or more of the TRPs of another NR Cell) and by UE 1812 for purposes of communicating signals and channels 1806 with TRPs 1802. That Mobility ID 1808 has been assigned can be indicated to TRPs 1802 in a manner similar to that set out in FIG. 16.

According to an embodiment, the NR system may configure TRPs in a "transition area" (for example, a certain subset of one or more TRPs of one or more NR Cells) to detect potential UL transmission based on the Mobility C-RNTI subset of UE identities. Specifically, the TRPs in the transition area may monitor for UL signals and channels (e.g. random access channel, physical UL control channel, physical UL data channel, UL sounding reference signal) based on the assigned Mobility C-RNTI. Alternatively, in another embodiment, if the TRPs in the transition area are not aware of which Mobility C-RNTI's are assigned (e.g. in the case where there is no signaling (or failure) from the network controller or TRP that assigns the UE ID's), the TRPs in the transition may blindly monitor the UL transmission by attempting all the Mobility C-RNTI's. If the range of Mobility C-RNTI's is small (in the order of tens of IDs), the increase in detection complexity is small.

Figure 19:
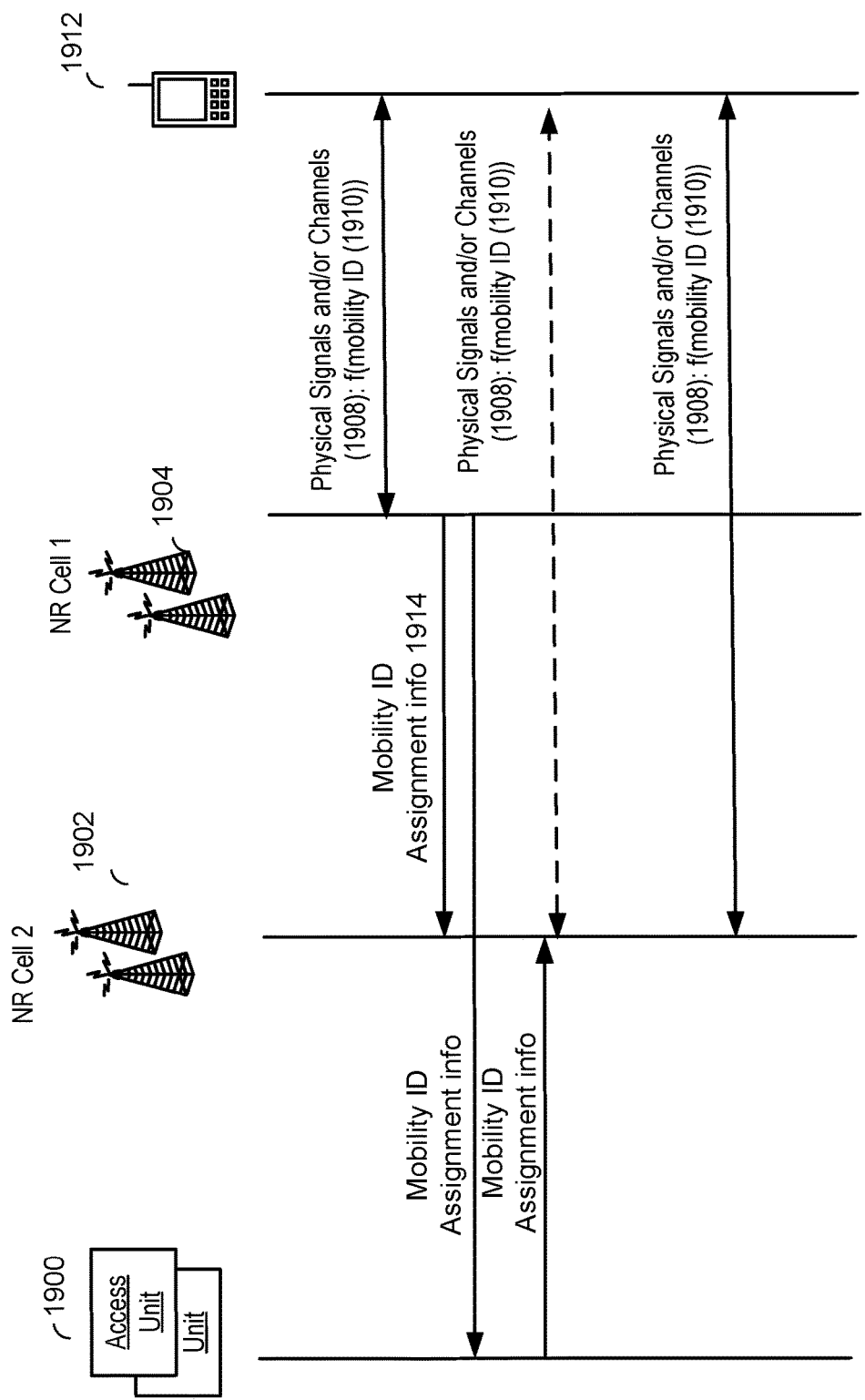
FIG. 19 illustrates an example of network transmission and reception in a transition area.

For example, as shown in FIG. 19, UE 1912 communicates with TRPs 1904 (which can be one or more gNodeBs) of an NR Cell using signals and channels 1908 provisioned in accordance with Mobility C-RNTI 1910. Optionally, information 1914 regarding this assignment of Mobility C-RNTI 1910 or a Mobility C-RNTI generally, is sent from TRPs 1904 of one NR Cell to TRPs 1902 of another NR Cell either directly, or via one or more access units 1900. One or more transmit points 1902, which can be a subset of the TRPs of another NR Cell, for example those in a transition area, monitor for communications occurring between UE 1912 and the source NR Cell (as indicated by a dashed line), including UL and/or DL communications. At a later time, for example when UE 1912 enters the coverage area of one or more TRPs in a transition area, UE 1912 begins communicating with the other NR Cell using physical signals and channels 1908 provisioned in accordance with Mobility C-RNTI 1910. One or more TRPs of target NR Cell can be configured to monitor communications in accordance with Mobility C-RNTI. This provides a more seamless mobility experience for the UE as multiple TRPs from a source and target NR Cell can process the signals and channels sent by the UE with improved reliability and performance. Techniques such as joint reception and/or selective combining, for example can be applied by these TRPs.

With respect to DL communications the NR system allows for transmitting signals and channels (e.g. physical DL control and data channels) using the assigned UE ID (Mobility C-RNTI) from TRPs of two NR Cells. For example, UE-dedicated DL control channel (e.g. NR PDCCH) resource mapping and/or scrambling may be a function of the assigned Mobility C-RNTI. Similarly, a UE can decode a UE-dedicated DL control channel that is transmitted by TRPs that belong to two different NR Cells.

Figure 20:
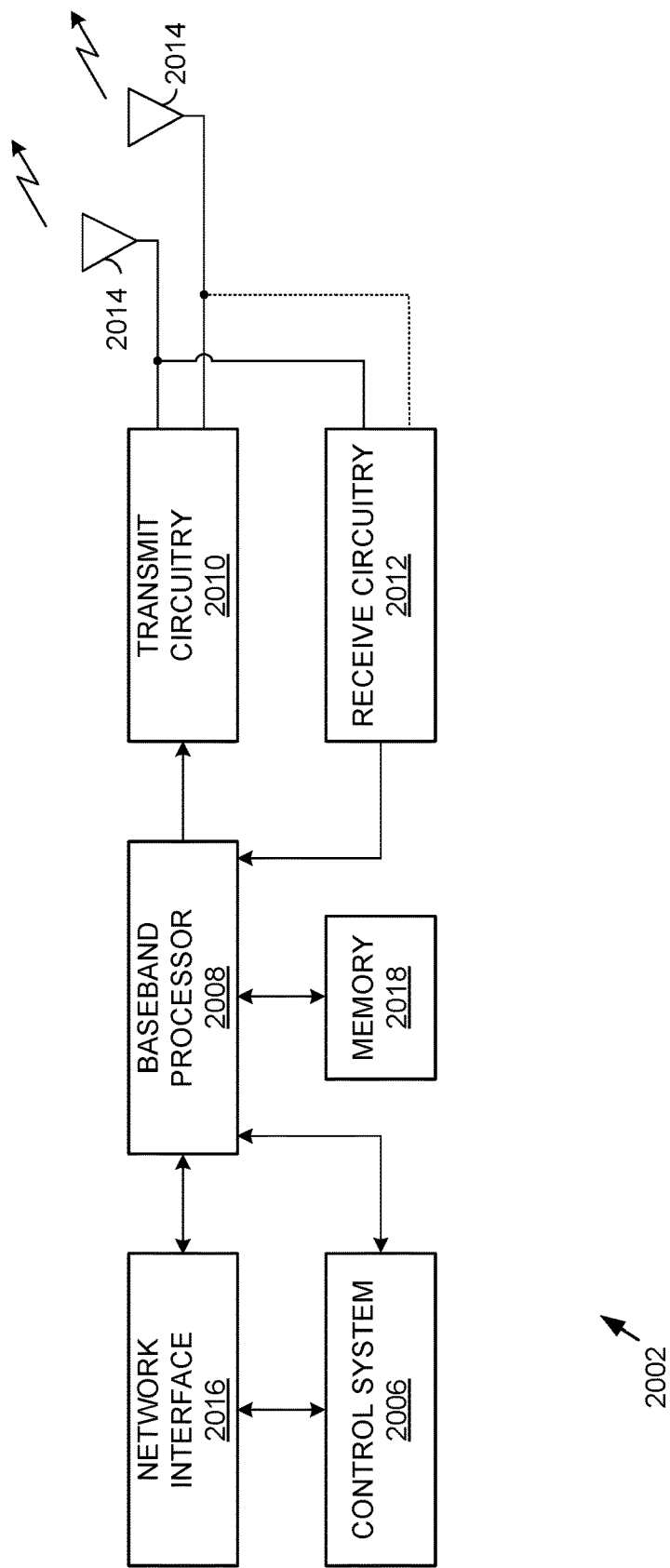
FIG. 20 illustrates a block diagram representation of a NR transmit/receive point in accordance with an embodiment of the present disclosure.

FIG. 20 illustrates a block diagram representation of a NR transmit/receive point in accordance with an embodiment of the present disclosure. A high-level description of a transmit/receive point 2002 that can be used in the NR system described above is illustrated. The transmit/receive point 2002 generally includes a control system 2006, a baseband processor 2008, memory 2018, transmit circuitry 2010, receive circuitry 2012, multiple antennas 2014, and interfaces 2016 which can include network interfaces including an Xn interface. Collectively transmit circuitry 2010 and receive circuitry 2012 is referred to as "transceiver circuitry." The memory 2018 may be any type of memory capable of storing software and data. The receive circuitry 2012 receives radio frequency signals bearing information from one or more remote UEs as will be described in conjunction with FIG. 15. Preferably, a low noise amplifier and a filter (not shown) cooperate to amplify and remove broadband interference from the signal for processing. down-conversion and digitization circuitry (not shown) will then downconvert the filtered, received signal to an intermediate or baseband frequency signal, which is then digitized into one or more digital streams.

The baseband processor (base band processor circuitry) 2008 processes the digitized received signal to extract the information or data bits conveyed in the received signal. This processing typically includes demodulation, decoding, and error correction operations. As such, the baseband processor 2008 is generally implemented in one or more DSPs or application-specific integrated circuits (ASICs). The received information is then sent to an associated network via the network interface 2016 or transmitted to another mobile terminal serviced by the transmit/receive point 2002.

On the transmit side, the baseband processor 2008 receives digitized data, which may represent voice, data, or control information, from the network interface 2016 under the control of the control system 2006, and encodes the data for transmission. The encoded data is output to the transmit circuitry 2010, where it is modulated by a carrier signal having a desired transmit frequency or frequencies. A power amplifier (not shown) will amplify the modulated carrier signal to a level appropriate for transmission, and deliver the modulated carrier signal to the antennas 2014 through a matching network (not shown). The transmit/receive point 2002 may transmit signals using multiple antennas 2014, but may receive signals using a single antenna 2014, or vice versa.

Figure 21:
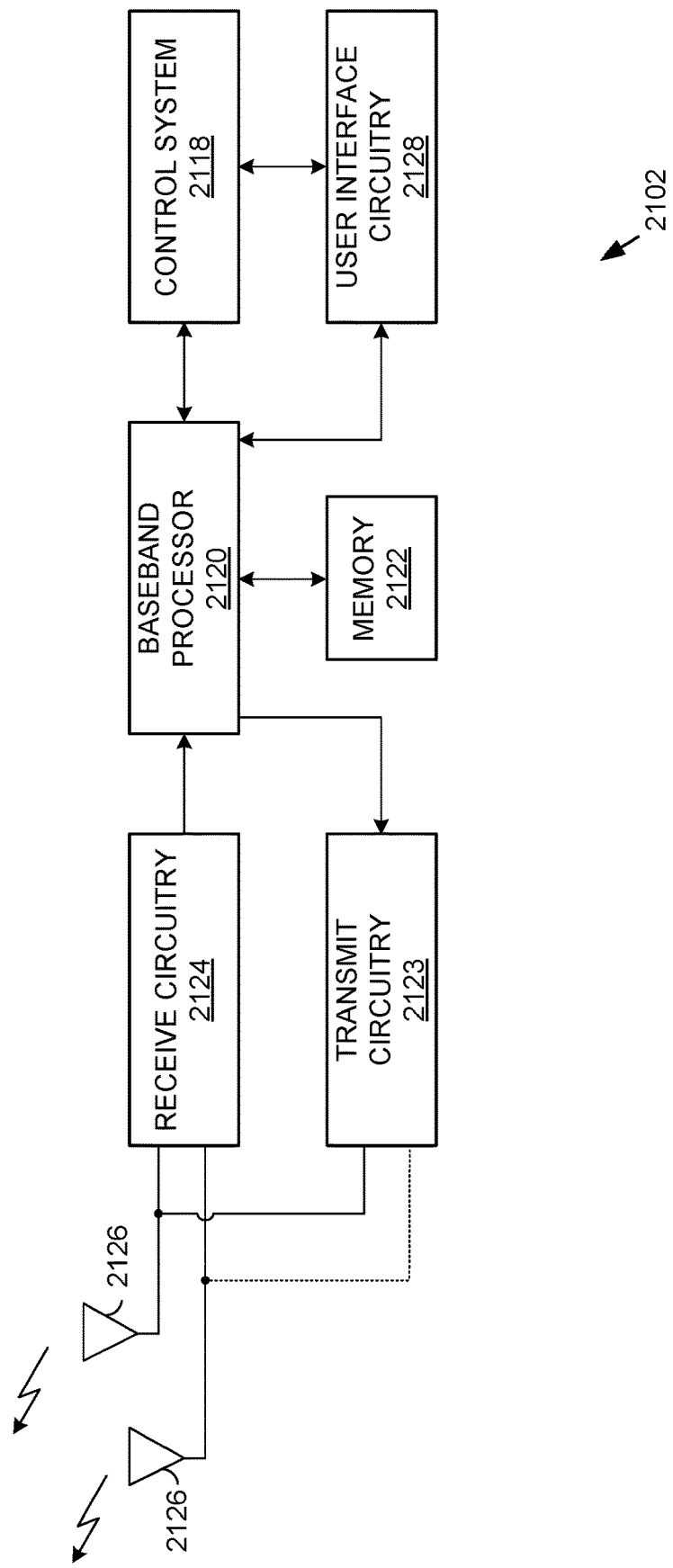
FIG. 21 illustrates a block diagram representation of a NR UE in accordance with an embodiment of the present disclosure.

With respect to the central access units describe earlier, a similar architecture to that for a transmit/receive point in FIG. 21 could be used but with different interfaces and transmit/receive circuitry. For example, the transmit/receive circuitry may be for optical, DSL or any other communication scheme. If collocated with a transmit/receive point, a central access unit could reuse the baseband processor and other components of the transmit/receive point as necessary (e.g. interfaces for communicating with other transmit/receive points such as an Xn interface).

FIG. 21 illustrates a block diagram representation of a NR UE in accordance with an embodiment of the present disclosure. A high-level description of the components of UE 2102 is shown. Similarly, to the transmit/receive point 2002, the UE 2102 will include a control system 2118, a baseband processor (baseband processor circuitry) 2120, memory 2122, transmit circuitry 2123, receive circuitry 2124, multiple antennas 2126, and user interface circuitry 2128. Collectively transmit circuitry 1523 and receive circuitry 2124 is referred to as "transceiver circuitry." The receive circuitry 2124 receives radio frequency signals bearing information from one or more transmit/receive points 2002. Preferably, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 2120 processes the digitized received signal to extract the information or data bits conveyed in the received signal. This processing typically includes demodulation, decoding, and error correction operations. The baseband processor 2120 is generally implemented in one or more DSP, ASIC, or both.

For transmission, the baseband processor 2120 receives digitized data, which may represent voice, data, or control information, from the control system 2118 or the interface circuitry 2128, which it encodes for transmission. The encoded data is output to the transmit circuitry 2123, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 2126 through a matching network (not shown). The UE 2104 may receive signals using both antennas 2126, but transmits signals using a single antenna 2126. Various modulation and processing techniques available to those skilled in the art are applicable.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block.

OFDM may be used for at least the downlink transmission from the transmit/receive points 2002 to the mobile terminals 2102. Each transmit/receive point 2002 is equipped with n transmit antennas 2014, and each mobile terminal 2102 is equipped with m receive antennas 2126. Notably, the respective antennas can be used for reception and transmission using appropriate duplexers or switches. SC-FDMA may be used for uplink transmissions to the transmit/receive point.

Figure 22:
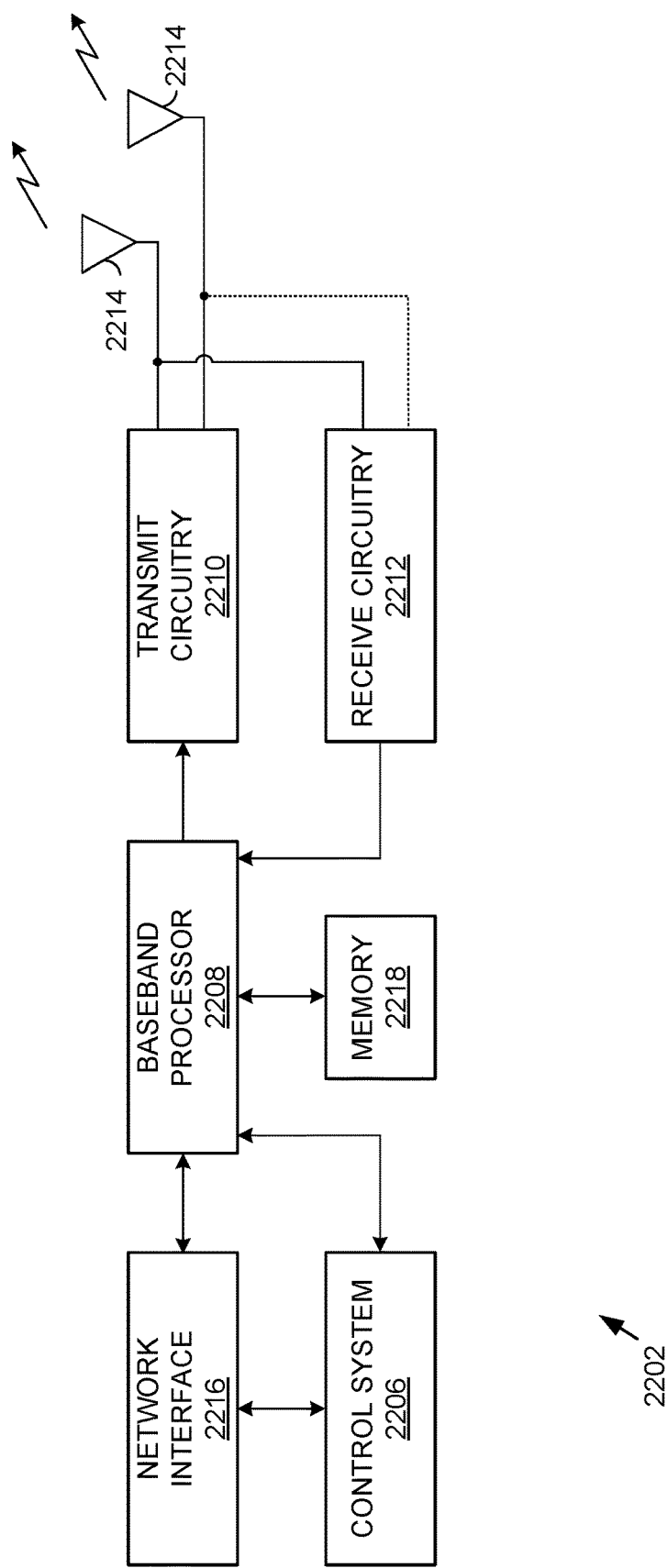
FIG. 22 illustrates a block diagram representation of a NR access unit in accordance with an embodiment of the present disclosure.

FIG. 22 illustrates a block diagram representation of an access unit in accordance with an embodiment of the present disclosure. A high-level description of an access unit 2202 that can be used in the NR system described above is illustrated. The access unit 2202 generally includes a control system 2206, a baseband processor 2208, memory 2218, and interfaces 2216 which can include network interfaces for communicating with TRPs, other access units and/or other network nodes. Access unit 2202 may include wireless transmit circuitry 2210, receive circuitry 2212, and multiple antennas 2214, for communicating with TRPs and/or UE's (e.g. if the access unit is collocated with a TRP). Collectively transmit circuitry 2210 and receive circuitry 2212 is referred to as "transceiver circuitry." The memory 2218 may be any type of memory capable of storing software and data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," "baseband processor," and/or "processing unit" or their equivalents may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method in a network having a plurality of transmit and receive points communicatively coupled to one or more access units, where a first subset of transmit and receive points of the plurality of transmit and receive points are associated with a first cell identifier (ID) and where a second subset of transmit and receive points of the plurality of transmit and receive points are associated with a second cell ID, the method comprising:
    transmitting from or receiving by a first group of at least one transmit and receive point of the first subset of transmit and receive points a first signal or a first channel for a first user equipment (UE) using a first UE ID, the first UE ID being assigned to the first UE via at least one of the second subset of transmit and receive points; and
    transmitting from or receiving by the first group of at least one transmit and receive point of the first subset of transmit and receive points a second signal or a second channel for a second UE using a second UE ID, the second UE ID being assigned to the second UE via at least one of the first subset of transmit and receive points in place of an assigned third UE ID, the third UE ID previously assigned to the second UE via at least one of the second subset of transmit and receive points;
    wherein the first UE ID is from a first UE ID group; and
    wherein the second UE ID is from a second UE ID group.

2. The method of claim 1, wherein the first UE ID group includes a first plurality of UE IDs, and wherein the second UE ID group includes a second plurality of UE IDs, the method further comprising, receiving from the one or more access units an indication of the first plurality of UE IDs in the first UE ID group and the second plurality of UE IDs in the second UE ID group.

3. The method of claim 1, further comprising transmitting an indication of a first plurality of UE IDs in the first UE ID group.

4. The method of claim 1, further comprising disabling use of the first UE ID group.

5. The method of claim 1, further comprising receiving from at least one transmit and receive point of the second subset of transmit and receive points an indication of the first UE ID.

6. The method of claim 5, wherein receiving from the at least one transmit and receive point of the second subset of transmit and receive points the indication of the first UE ID includes receiving via one or more of the access units.

7. The method of claim 1, wherein the first UE ID group is modified to contain additional UE IDs beyond a first plurality of UE IDs in the first UE ID group.

8. The method of claim 1, wherein the first UE ID is assigned based on downlink measurements reported from the first UE.

9. The method of claim 1, wherein the first UE ID is assigned based on uplink communications received from the first UE.

10. The method of claim 9, wherein the uplink communications include sounding reference signals.

11. The method of claim 1, wherein the first UE ID is assigned pursuant to a contention-free access procedure.

12. The method of claim 1, wherein the first UE ID is assigned pursuant to a random access procedure.

13. The method of claim 1, wherein the first UE ID is assigned based on a UE type associated with the first UE.

14. The method of claim 1, wherein the first UE ID is assigned based on UE mobility of the first UE.

15. The method of claim 1, further comprising monitoring for uplink transmissions provisioned based on the first UE ID with knowledge that the first UE ID is assigned.

16. The method of claim 1, further comprising monitoring for uplink transmissions provisioned based on the first UE ID without knowledge that the first UE ID is assigned.

17. The method of claim 1, wherein the first UE ID group comprises a group of UE IDs reserved for assignment to UEs transitioning between different cells.

18. The method of claim 17, wherein the transmitting from or receiving by the first group of at least one transmit and receive point of the first signal or the first channel is for the first UE that is in a transition area between a first cell and a second cell.

19. A first transmit and receive point for use in a network including a plurality of transmit and receive points communicatively coupled to one or more access units, where a first subset of transmit and receive points of the plurality of transmit and receive points are associated with a first cell identifier (ID) and where a second subset of transmit and receive points of the plurality of transmit and receive points are associated with a second cell ID, the first transmit and receive point comprising:
    processing circuitry;
    transceiver circuitry; and
    a memory;
    wherein the memory includes instructions for causing the processing circuitry to:
        transmit or receive, via the transceiver circuitry, a first signal or a first channel for a first user equipment (UE) using a first UE ID, the first UE ID being assigned to the first UE via at least one of the second subset of transmit and receive points; and
        transmit or receive, via the transceiver circuitry, a second signal or a second channel for a second UE using a second UE ID, the second UE ID being assigned to the second UE via at least one of the first subset of transmit and receive points in place of an assigned third UE ID, the third UE ID previously assigned to the second UE via at least one of the second subset of transmit and receive points;

wherein the first UE ID is from a first UE ID group; and wherein the second UE ID is from a second UE ID group.

20. The first transmit and receive point of claim 19, wherein the first UE ID group includes a first plurality of UE IDs, wherein the second UE ID group includes a second plurality of UE IDs, and wherein the memory further includes instructions for causing the processing circuitry to receive, via the transceiver circuitry, from the one or more access units an indication of the first plurality of UE IDs in the first UE ID group and the second plurality of UE IDs in the second UE ID group.

21. The first transmit and receive point of claim 19, wherein the memory further includes instructions for causing the processing circuitry to transmit, via the transceiver circuitry, an indication of a first plurality of UE IDs in the first UE ID group.

22. The first transmit and receive point of claim 19, wherein the memory further includes instructions for causing the processing circuitry to disable use of the first UE ID group.

23. The first transmit and receive point of claim 19, wherein the memory further includes instructions for causing the processing circuitry to receive, via the transceiver circuitry, from at least one transmit and receive point of the second subset of transmit and receive points of the plurality of transmit and receive points an indication of the first UE ID.

24. The first transmit and receive point of claim 23, wherein the memory further includes instructions for causing the processing circuitry to receive, via the transceiver circuitry, the indication of the first UE ID via the one or more access units.

25. The first transmit and receive point of claim 19, wherein the memory further includes instructions for causing the processing circuitry to modify the first UE ID group to contain additional UE IDs beyond a first plurality of UE IDs in the first UE ID group.

26. The first transmit and receive point of claim 19, wherein the memory further includes instructions for causing the processing circuitry to transmit, via the transceiver circuitry, downlink signals, and wherein the first UE ID is assigned based on downlink measurements pertaining to said downlink signals reported from the first UE.

27. The first transmit and receive point of claim 19, wherein the memory further includes instructions for causing the processing circuitry to receive, via the transceiver circuitry, uplink communications from the first UE and to transmit, via the transceiver circuitry, information pertaining to the uplink communications, wherein the first UE ID is assigned based on the information pertaining to the uplink communications.

28. The first transmit and receive point of claim 27, wherein the uplink communications include sounding reference signals.

29. The first transmit and receive point of claim 19, wherein the first UE ID is assigned pursuant to a contention-free access procedure.

30. The first transmit and receive point of claim 19, wherein the first UE ID is assigned pursuant to a random access procedure.

31. The first transmit and receive point of claim 19, wherein the first UE ID is assigned based on a UE type associated with the first UE.

32. The first transmit and receive point of claim 19, wherein the first UE ID is assigned based on UE mobility of the first UE.

33. The first transmit and receive point of claim 19, wherein the memory further includes instructions for causing the processing circuitry to monitor, via the transceiver circuitry, for uplink transmissions provisioned based on the first UE ID with knowledge that the first UE ID is assigned.

34. The first transmit and receive point of claim 19, wherein the memory further includes instructions for causing the processing circuitry to monitor, via the transceiver circuitry, uplink transmissions provisioned based on the first UE ID without knowledge that the first UE ID is assigned.

35. The first transmit and receive point of claim 19, wherein the first UE ID group comprises a group of UE IDs reserved for assignment to UEs transitioning between different cells.

36. The first transmit and receive point of claim 35, wherein the transmitting or receiving of the first signal or the first channel is for the first UE that is in a transition area between a first cell and a second cell.

* * * * *